United States Patent
Gunnewiek et al.

(10) Patent No.: US 9,787,624 B2
(45) Date of Patent: Oct. 10, 2017

(54) TAKING ACTIONS ON NOTIFICATIONS USING AN INCOMPLETE DATA SET FROM A MESSAGE

(71) Applicant: Pebble Technology, Corp., Redwood City, CA (US)

(72) Inventors: Phil Gunnewiek, Waterloo (CA); Brian Jett, Indianapolis, IN (US); Jason Lai, Saratoga, CA (US); Henry Levak, San Mateo, CA (US)

(73) Assignee: Pebble Technology, Corp., Redwood City, CA (US)

( * ) Notice: Subject to any disclaimer, the term of this patent is extended or adjusted under 35 U.S.C. 154(b) by 0 days.

(21) Appl. No.: 15/050,247

(22) Filed: Feb. 22, 2016

(65) Prior Publication Data

US 2017/0244660 A1    Aug. 24, 2017

(51) Int. Cl.
*G06F 15/16* (2006.01)
*H04L 12/58* (2006.01)
(Continued)

(52) U.S. Cl.
CPC ............ *H04L 51/24* (2013.01); *H04B 1/3827* (2013.01); *H04L 51/04* (2013.01); *H04L 51/22* (2013.01); *H04W 4/14* (2013.01)

(58) Field of Classification Search
CPC ....... H04L 1/1867; H04L 12/587; H04L 1/06; H04L 43/0811; H04L 51/24; H04L 67/36;
(Continued)

(56) References Cited

U.S. PATENT DOCUMENTS 5,821,928 A    10/1998  Melkus et al.
5,966,663 A    10/1999  Gleason
(Continued)

FOREIGN PATENT DOCUMENTS

| EP | 2504961 | 10/2012 |
| EP | 002655142-0001 | 3/2015 |
| EP | 002655118-0001 | 4/2015 |

OTHER PUBLICATIONS

U.S. Appl. No. 14/693,557, filed Apr. 22, 2015, Behrens, et al.
U.S. Appl. No. 15/051,527, filed Feb. 23, 2016, Kirov, et al.
U.S. Appl. No. 15/050,080, filed Feb. 22, 2016, Jett.

*Primary Examiner* — Joseph Greene
(74) *Attorney, Agent, or Firm* — Rutan & Tucker LLP

(57) ABSTRACT

An apparatus, a system, and a method in which a message notification application such as an e-mail notification application resident in a first memory on a wearable electronic device is configured to provide messaging actions; where the message notification application has a user interface to present content of a message originating from an message application resident on a mobile computing device; where the message notification application is configured to analyze a notification of the message to obtain an incomplete data set; and where the message notification application is configured to work with a server configured to integrate with one or more application programming interfaces of one or more messaging service providers, where the server has a server module configured to receive the incomplete data set and use all or a portion of the incomplete data set as search query terms to retrieve an instance of the message in its full-message format.

20 Claims, 17 Drawing Sheets

(51) Int. Cl.
*H04W 4/14* (2009.01)
*H04B 1/3827* (2015.01)

(58) Field of Classification Search
CPC ............... H04L 67/26; H04L 12/1895; H04L 12/5895; H04L 63/123; H04L 67/322; H04L 67/04; H04L 12/189; H04W 8/183; H04W 4/008; H04W 4/12; H04W 68/02; H04W 88/06; H04M 1/7253; H04M 1/72527; H04M 1/72597; H04M 1/56; H04M 1/575; H04M 1/72552; H04M 2250/02; H04M 2250/60
USPC .......................................................... 709/206
See application file for complete search history.

(56) References Cited

U.S. PATENT DOCUMENTS

| | | |
|---|---|---|
| 7,310,720 B2 | 12/2007 | Cornett |
| 7,609,686 B1 | 10/2009 | McNamara et al. |
| 7,818,223 B1 | 10/2010 | Campbell et al. |
| 8,099,520 B2 | 1/2012 | Kulkarni |
| 8,688,528 B2 | 4/2014 | Leahy |
| 8,930,067 B1 | 1/2015 | Green et al. |
| D733,142 S | 6/2015 | Solomon et al. |
| D743,278 S | 11/2015 | Solomon et al. |
| D745,515 S | 12/2015 | Solomon et al. |
| D750,625 S | 3/2016 | Solomon et al. |
| D752,583 S | 3/2016 | Solomon et al. |
| D755,178 S | 5/2016 | Solomon et al. |
| 2002/0018547 A1 | 2/2002 | Takae et al. |
| 2002/0116472 A1 | 8/2002 | Kalish et al. |
| 2004/0260780 A1 | 12/2004 | Eisen |
| 2005/0240512 A1 | 10/2005 | Quintero et al. |
| 2005/0278643 A1 | 12/2005 | Ukai et al. |
| 2006/0143307 A1 | 6/2006 | Codignotto |
| 2006/0242412 A1 | 10/2006 | Jung et al. |
| 2006/0253451 A1 | 11/2006 | Van De Sluis |
| 2006/0277481 A1 | 12/2006 | Forstall et al. |
| 2007/0005701 A1 | 1/2007 | Barsness et al. |
| 2007/0043646 A1 | 2/2007 | Morris |
| 2007/0050510 A1 | 3/2007 | Jiang |
| 2007/0197196 A1 | 8/2007 | Shenfield et al. |
| 2007/0197878 A1 | 8/2007 | Shklarski |
| 2007/0268985 A1 | 11/2007 | Ry et al. |
| 2007/0271234 A1 | 11/2007 | Ravikiran |
| 2008/0188251 A1 | 8/2008 | Weinrib |
| 2009/0319366 A1 | 12/2009 | Choi et al. |
| 2009/0322513 A1 | 12/2009 | Hwang et al. |
| 2010/0058231 A1 | 3/2010 | Duarte et al. |
| 2010/0087230 A1 | 4/2010 | Peh et al. |
| 2010/0091677 A1 | 4/2010 | Griff et al. |
| 2010/0179991 A1 | 7/2010 | Lorch et al. |
| 2010/0180001 A1 | 7/2010 | Hardt |
| 2010/0293238 A1 | 11/2010 | Nottingham et al. |
| 2011/0004692 A1 | 1/2011 | Occhino et al. |
| 2011/0065475 A1 | 3/2011 | Choi et al. |
| 2011/0075621 A1 | 3/2011 | Sung et al. |
| 2011/0112952 A1 | 5/2011 | Annunziata et al. |
| 2011/0113073 A1 | 5/2011 | Chang |
| 2011/0173086 A1 | 7/2011 | Berkowitz |
| 2012/0058776 A1 | 3/2012 | Ligeret |
| 2012/0066068 A1 | 3/2012 | Pan |
| 2012/0196571 A1 | 8/2012 | Grkov |
| 2012/0210334 A1 | 8/2012 | Sutedja et al. |
| 2012/0253946 A1 | 10/2012 | Moore et al. |
| 2012/0260215 A1 | 10/2012 | Fennel |
| 2012/0302198 A1 | 11/2012 | Ku |
| 2013/0024779 A1 | 1/2013 | Bechtel et al. |
| 2013/0040610 A1* | 2/2013 | Migicovsky .......... H04L 1/1867 455/412.2 |
| 2013/0077772 A1 | 3/2013 | Lichorowic et al. |
| 2013/0117707 A1 | 5/2013 | Wheeler |
| 2013/0132977 A1 | 5/2013 | Doyle |
| 2013/0196685 A1 | 8/2013 | Griff et al. |
| 2013/0218971 A1 | 8/2013 | Sasaki et al. |
| 2013/0219332 A1 | 8/2013 | Woley et al. |
| 2013/0305187 A1 | 11/2013 | Phillips et al. |
| 2014/0013207 A1 | 1/2014 | Wu et al. |
| 2014/0038561 A1 | 2/2014 | Wang et al. |
| 2014/0143803 A1 | 5/2014 | Narsimhan et al. |
| 2014/0179358 A1 | 6/2014 | Khan |
| 2014/0229655 A1 | 8/2014 | Goss |
| 2014/0282047 A1 | 9/2014 | Lee et al. |
| 2014/0289066 A1 | 9/2014 | Shah et al. |
| 2015/0065893 A1 | 3/2015 | Ye |
| 2015/0089666 A1 | 3/2015 | Lee et al. |
| 2015/0100644 A1 | 4/2015 | Gulik |
| 2015/0106221 A1 | 4/2015 | Tapley |
| 2015/0120845 A1 | 4/2015 | Mcclard et al. |
| 2015/0126117 A1 | 5/2015 | Wong et al. |
| 2015/0223033 A1 | 8/2015 | Migicovsky et al. |
| 2015/0223034 A1 | 8/2015 | Migicovsky et al. |
| 2015/0281156 A1* | 10/2015 | Beausoleil .............. H04L 51/14 709/206 |
| 2015/0333302 A1 | 11/2015 | Johns et al. |
| 2015/0334772 A1 | 11/2015 | Wong et al. |
| 2015/0341903 A1 | 11/2015 | Jeong |
| 2016/0014266 A1 | 1/2016 | Bhatt |
| 2016/0085397 A1* | 3/2016 | Jain ....................... G06F 3/0484 715/828 |
| 2016/0099896 A1* | 4/2016 | Huang .................. H04L 63/083 709/206 |
| 2016/0127875 A1* | 5/2016 | Zampini, II .......... H04W 4/043 370/311 |
| 2016/0134932 A1* | 5/2016 | Karp .................... H04N 21/4431 348/155 |

\* cited by examiner

TAKING ACTIONS ON NOTIFICATIONS USING AN INCOMPLETE DATA SET FROM A MESSAGE

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD

Embodiments generally relate to taking actions on notifications using an incomplete data set from a message, such as an e-mail.

BACKGROUND

Due to certain limitations imposed by proprietary systems, users of wearable electronic devices might not be able to act on incoming messages on the wearable electronic devices.

SUMMARY

Apparatuses, systems, and processes are discussed for a message notification application. In some embodiments, such a message notification application can be an e-mail notification application, an SMS notification application, a chat or other instant message notification application, or a similar application resident in a first memory on a wearable electronic device. The message notification application can provide messaging actions, such as two or more messaging actions, selected from the group of a reply action, a reply-to-all action, a forward action, a delete action, an archive action, a mark-as-read action, and other similar actions. The message notification application may allow a user to take one or more of the messaging actions regarding a notification from within the message notification application. The message notification application can be configured present one or more user interfaces on a display screen of the wearable electronic device with content of a message originating from any of an e-mail application, an SMS application, or a chat or other instant message application resident on a mobile computing device. The message notification application can analyze a notification of the message to obtain an incomplete data set associated with the message. The message notification application can provide the user of the wearable electronic device a way to select from the two or more messaging actions using the incomplete data set without leaving the message notification application. The message notification application can work with any of the group of i) a server configured to integrate with one or more application programming interfaces of one or more messaging service providers; ii) a partner application resident in a second memory of the mobile computing device configured to cooperate with the message notification application on the wearable electronic device; or iii) both i) and ii) above. With respect to i), the server can have a server module configured to receive the incomplete data set and use all or a portion of the incomplete data set as search query terms to retrieve an instance of the message in its full-message format from the one or more messaging service providers. With respect to ii), the partner application can receive the incomplete data set from the message notification application and then provide all or a portion of the incomplete data set as search query terms in order for the server module to retrieve the instance of the message in its full-message format. Any portions of the message notification application implemented in software can be stored on a non-transitory computer-readable medium in an executable format.

Also provided herein is a system with a message notification application, in some embodiments. In addition to the foregoing apparatus, the system can include an e-mail server of an e-mail service provider.

Also provided herein is a method for providing one or more messaging actions in a message notification application. The message notification application can be any of an e-mail notification application, an SMS notification application, a chat or other instant message notification application, or a similar application resident in a first memory on a wearable electronic device. The one or more messaging actions can be selected from the group of a reply action, a reply-to-all action, a forward action, a delete action, an archive action, and a mark-as-read action in a message notification application. The method incorporates displaying content of a message in one or more user interfaces on a display screen of the wearable electronic device. The method incorporates analyzing a notification of the message to obtain an incomplete data set associated with the message and providing a user of the wearable electronic device a way to select from the one or more messaging actions using the incomplete data set.

DRAWINGS

The drawings refer to embodiments of the design in which.

Figure 1A:
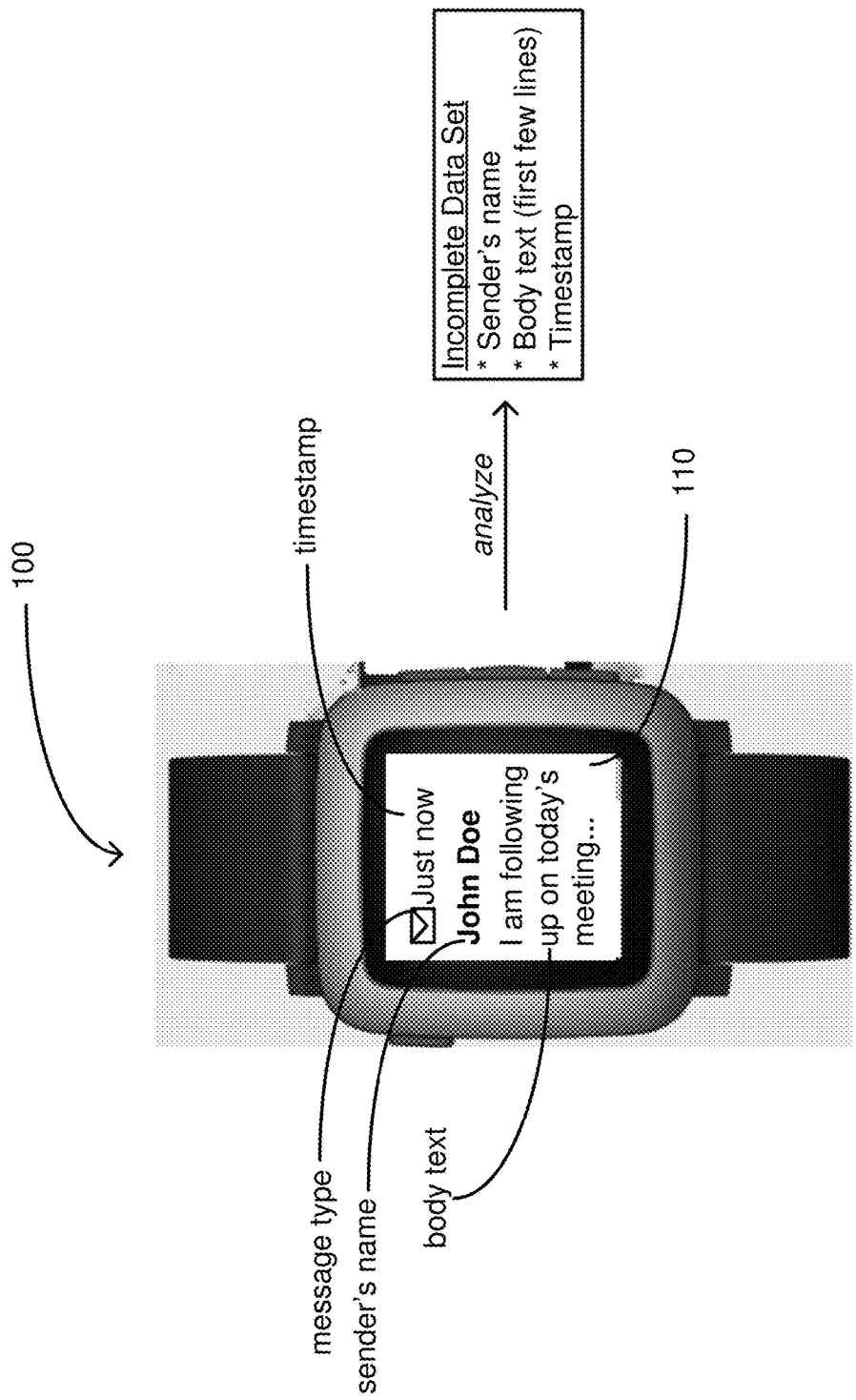
FIG. 1A illustrates a wearable electronic device showing a message notification in a message notification application in accordance with some embodiments.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DESCRIPTION

In the following description, numerous specific details are set forth, such as examples of specific data signals, named components, connections, number of memory columns in a group of memory columns, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further specific numeric references such as first driver, can be made. However, the specific numeric reference should not be interpreted as a literal sequential order but rather interpreted that the first driver is different than a second driver. Thus, the specific details set forth are merely exemplary. The specific details can be varied from and still be contemplated to be within the spirit and scope of the present design. The term coupled is defined as meaning connected either directly to the component or indirectly to the component through another component.

Provided herein is an apparatus with a message notification application that allows a user to take one or more messaging actions regarding a notification from within the message notification application, in some embodiments. Such a message notification application can be an e-mail notification application, an SMS notification application, a chat or other instant message notification application, or a similar application resident in a first memory on a wearable electronic device. The message notification application can provide messaging actions such as two or more messaging actions selected from the group of a reply action, a reply-to-all action, a forward action, a delete action, an archive action, and a mark-as-read action. The message notification application may allow a user to take one or more of the messaging actions regarding a notification from within the message notification application. The message notification application can present one or more user interfaces on a display screen of the wearable electronic device with content of a message originating from any of an e-mail application, an SMS application, or a chat or other instant message application resident on a mobile computing device. The message notification application can analyze a notification of the message to obtain an incomplete data set associated with the message. The message generally has a full set of all of the data and actions to take associated with that message. The message notification application can provide the user of the wearable electronic device a way to select from the two or more messaging actions using the incomplete data set, and the user can take the selected actions without leaving the message notification application. The message notification application can work with any of the group of i) a server configured to integrate with one or more application programming interfaces of one or more messaging service providers; ii) a partner application resident in a second memory of the mobile computing device configured to cooperate with the message notification application on the wearable electronic device; or iii) both i) and ii) above. With respect to i), the server can have a server module configured to receive the incomplete data set and use all or a portion of the incomplete data set as search query terms to retrieve an instance of the message in its full-message format from the one or more messaging service providers. With respect to ii), the partner application can receive the incomplete data set from the message notification application and then provide all or a portion of the incomplete data set as search query terms in order for the server module to retrieve the instance of the message in its full-message format. Any portions of the message notification application implemented in software can be stored on a non-transitory computer-readable medium in an executable format.

FIG. 1A illustrates a wearable electronic device 100 showing a message notification in a message notification application 110 in accordance with some embodiments. As shown, the message notification can have a data set of information or content from a message, but is not limited to, a message type, a timestamp, a sender's name, the subject line of the e-mail, and some body text such as the first few lines of the message. Analysis of the message notification provides an incomplete data set associated with the message. As shown, the incomplete data set has the sender's name, some body text such as the first few lines of the message, and the timestamp.

Figure 2:
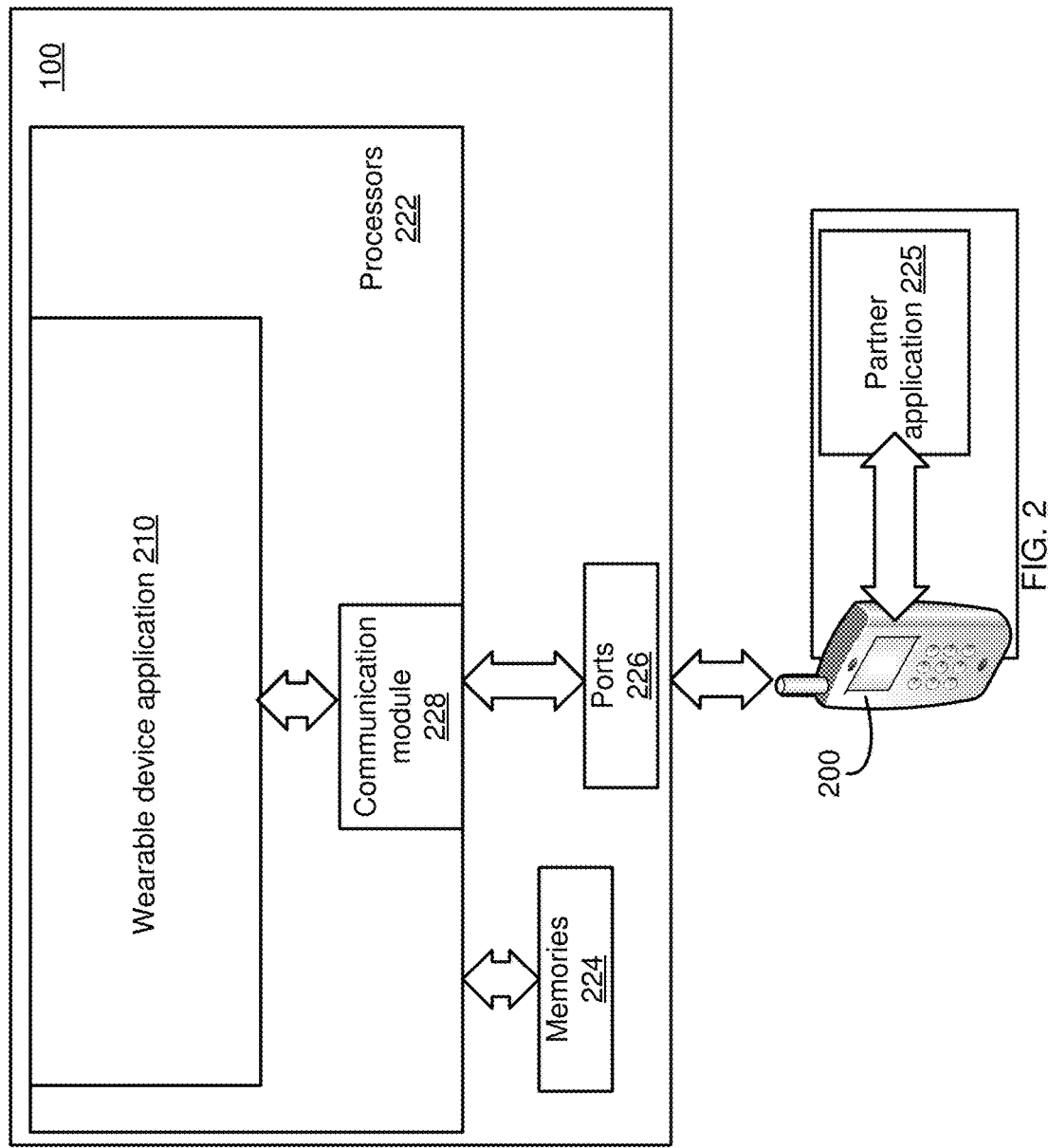
FIG. 2 illustrates a wearable electronic device in accordance with some embodiments.

The message notification application 110 can have one or more user interfaces to present the content of a message originating from any of an e-mail application, an SMS application, or a chat or other instant message application resident on a mobile computing device 200 (FIG. 2). The one or more user interfaces can be on a display screen of the wearable electronic device 100. The message notification application 110 can analyze a notification of the message to obtain the incomplete data set associated with the message.

If the message is an e-mail message, the incomplete data set can have two or more e-mail message-related fields selected from the group of i) a title or a subject line; ii) a sender's name; iii) a sender's e-mail address from a reverse look-up in a contacts application on the mobile computing device 200 matching the sender's name; iv) one or more additional e-mail addresses respectively for additional e-mail message recipients from the reverse look-up; v) all or a portion of body text from the e-mail message; vi) a timestamp of receipt by an e-mail server; vii) a mobile application name that received the e-mail message; viii) any new content in the e-mail message the user of the wearable electronic device 100 wants to send in the messaging action; and ix) any hidden data or characters embedded in the incomplete data set. The message generally has a full set of all of the data and actions to take associated with that message.

Figure 1B:
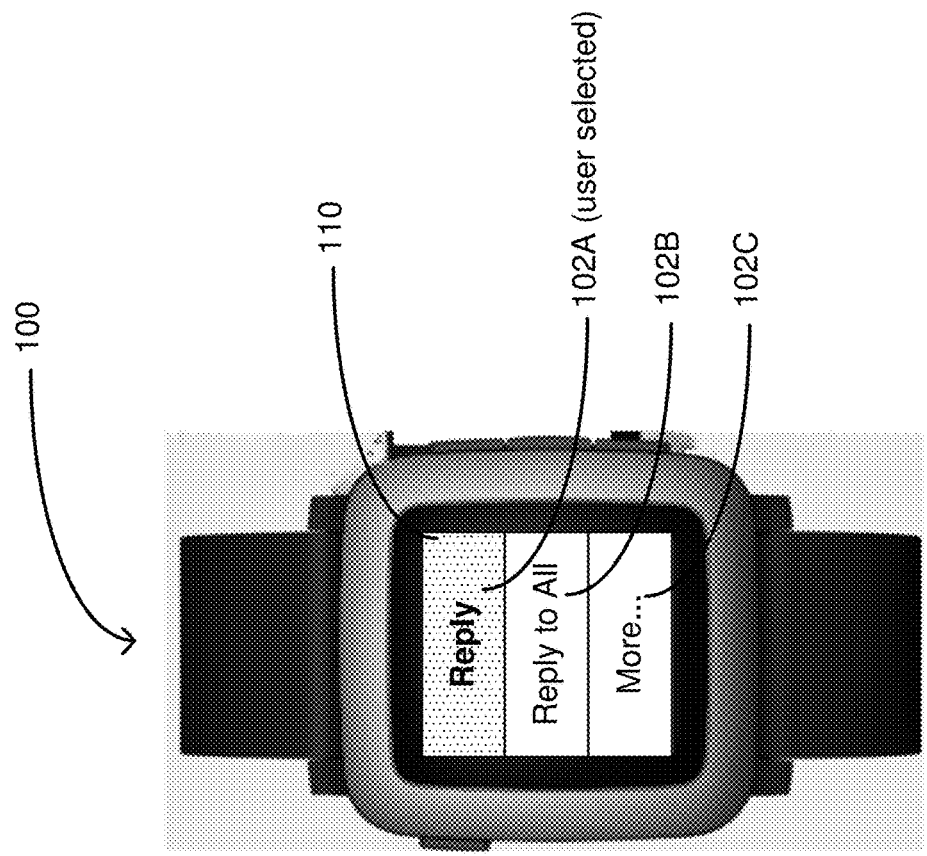
FIG. 1B illustrates a wearable electronic device showing messaging actions in a message notification application in accordance with some embodiments.

FIG. 1B illustrates the wearable electronic device 100 showing messaging actions 102A and 102B in the message notification application 110 in accordance with some embodiments. As shown, a first selectable messaging action 102A corresponds to a reply action, and a second selectable messaging action 102B corresponds to a reply-to-all action. The reply action in FIG. 1B is shaded to illustrate a user-selected messaging action.

The message notification application 110, such as any of an e-mail notification application, an SMS notification application, a chat or other instant message notification application, or a similar application can provide messaging actions 102 such as two or more messaging actions selected from the group of a reply action (e.g., the messaging action 102A), a reply-to-all action (e.g., the messaging action 102B), a forward action, a delete action, an archive action, and a mark-as-read action. The message notification application 110 can be a wearable device application 210 (FIG. 2) by itself, such as a watch application or an application or function thereof, or 2) may be an application that is part of the operating system of the wearable device, etc., (FIG. 2) resident in a memory of the wearable electronic device 100. Alternatively, the message notification application 110 can be a combination of the wearable device application 210 and a partner application 225 (FIG. 2) on a mobile computing device 200 (FIG. 2). Thus, all portions of the message notification application 110 can be in the wearable device application 210. Or, some portions of the message notification application 110 can be in the wearable device application 210 and some portions can be in the partner application 225.

The message notification application 110 can provide a user of the wearable electronic device 100 a way to select from the two or more messaging actions 102 using the incomplete data set. For example, the message notification application 110 can provide two or more of the foregoing messaging actions 102, and the user can subsequently select one of the messaging actions 102 on the display screen by touching the display screen (e.g., touchscreen) or pressing a corresponding button for the messaging action. The message notification application allows the user to take one or more of the messaging actions regarding a notification from within the message notification application itself rather than having to open up the specific application the message originated from.

The message notification application 110 can provide an option to dismiss the one or more messaging actions 102. For example, as shown in FIG. 1B, the user of the wearable electronic device can display additional messaging actions 102 by selecting "More . . . " for additional messaging actions 102. The message notification application 110 can present the additional messaging actions 102, one of which can be a dismiss action to merely dismiss this notification on the message.

FIG. 2 illustrates the wearable electronic device 100 in accordance with some embodiments. The wearable electronic device 100 can communicate with a mobile computing device 200, such as a smart phone, and a partner application 225 resident therein. The wearable electronic device 100 has one or more processors 222, memories 224, or ports 226. The wearable electronic device 100 also includes a communication module 228 that can run on the processors 222 for communicating outside of the wearable electronic device 100.

Figure 3A:
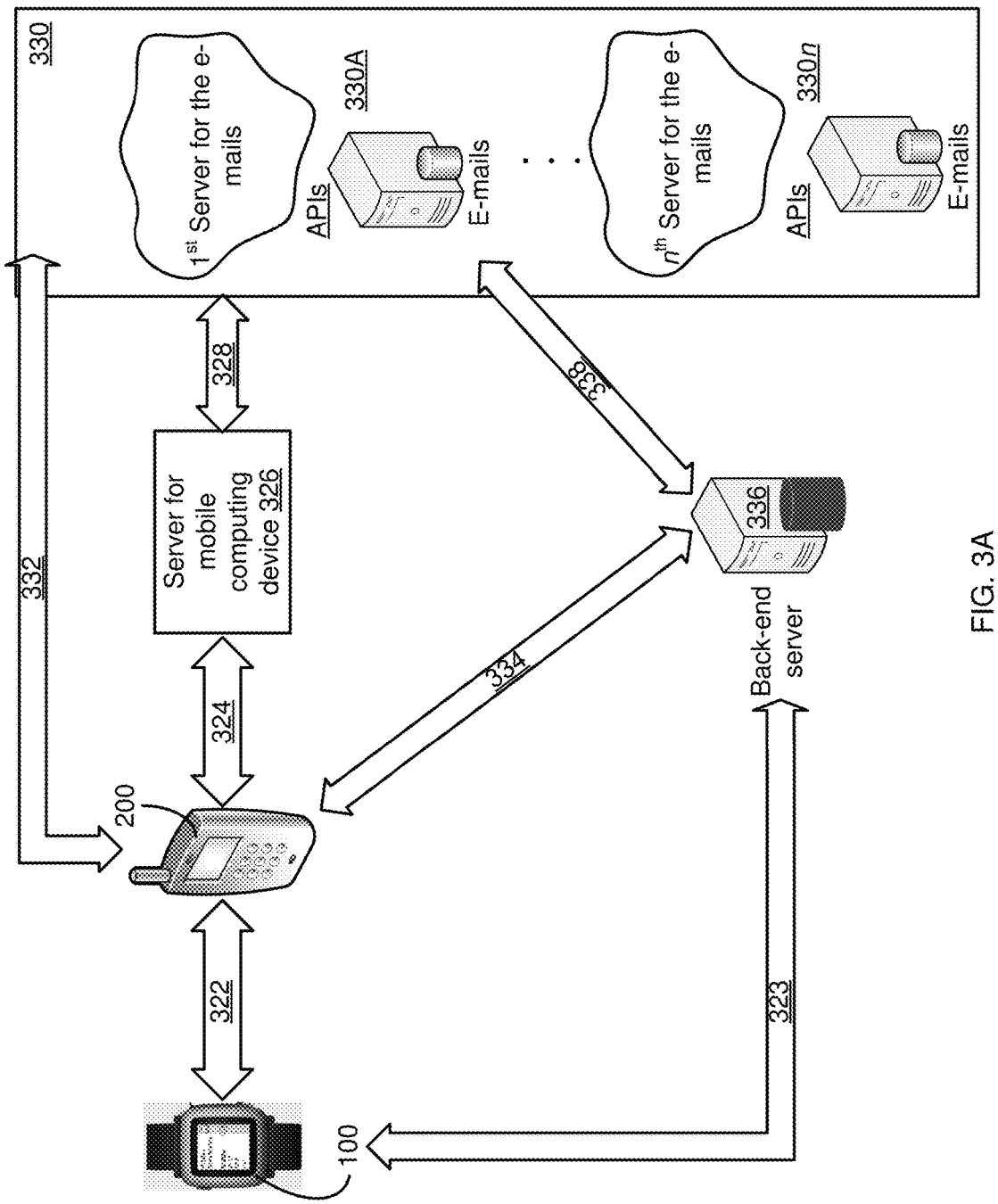
FIG. 3A illustrates communication channels for requests and responses in accordance with some embodiments.

FIG. 3A illustrates communication channels for requests and responses in accordance with some embodiments. As shown, the wearable electronic device 100 can be communicatively coupled through a wireless connection 322 with the mobile computing device 200. Thus, the wearable electronic device 100 and the mobile computing device 200 can send and receive signals from each other such as requests and responses through the wireless connection 322. Additionally or alternatively, the wearable electronic device 100 can be communicatively coupled through a wireless connection 323 to a back-end server 336.

The mobile computing device 200 can be communicatively coupled though a number of different connections to a number of different devices and/or systems for sending and receiving signals from each other as requests and responses. In a first example of communicative coupling, the mobile computing device 200 can be communicatively coupled through a wireless or cellular connection 324 with a proprietary server 326 for the mobile computing device 200. The mobile computing device 200 may utilize a proprietary operating system that passes notifications to the wearable electronic device 100 but not the actual message itself. The proprietary server 326, in turn, can be communicatively coupled through a connection 328 with a number of message servers 330, such as e-mail servers. The connection 328 can represent more than one connection. For example, the proprietary server 326 can be communicatively coupled to a first message server 330A through a first connection 328A (not shown) and a second or $n^{th}$ message server 330n through a second or $n^{th}$ connection 328n (not shown). Alternatively, in a second example of communicative coupling, the mobile computing device 200 can be communicatively coupled through a connection 332 that bypasses the proprietary server 326.

Due to certain limitations imposed by proprietary systems, users of wearable electronic devices such as the wearable electronic device 100 might not be able to act on incoming messages when communicating through these communication channels. In a third example of communicative coupling, the mobile computing device 200 can be communicatively coupled through a wireless or cellular connection 334 to a back-end server 336 for circumventing the limitations imposed by the proprietary systems. The back-end server 336, in turn, can be communicatively coupled through a connection 338 with the number of message servers 330. Like the connection 328, the connection 338 can represent more than one connection. For example, the back-end server 336 can be communicatively coupled to the first message server 330A through a first connection 338A (not shown) and the second or $n^{th}$ message server 330n through a second or $n^{th}$ connection 338n (not shown). In some embodiments, as discussed, the wearable electronic device 100 can also be communicatively coupled through a wireless or cellular connection 323 to a back-end server 336.

Utilizing the foregoing communication channels, the message notification application 110 can work with the back-end server 336, which, in turn, can integrate with one or more application programming interfaces of the servers 330 of the one or more messaging service providers. The back-end server 336 can have a server module configured to receive the incomplete data set from the message notification application 110 and use all or a portion of the incomplete data set as search query terms to retrieve an instance of a message in its full-message format from the one or more messaging service providers.

Referring to FIG. 2, the mobile computing device 200 can pass a notification to the wearable electronic device 100 but not the actual message itself. The message notification application 210 can work with a partner application 225 resident on the mobile computing device 200. The partner application 225 can receive the incomplete data set derived from the message notification application 110, and then the partner application 225 provides all or a portion of the incomplete data set for search query terms for the server module of the back-end server 336 to send as the search query terms to retrieve an instance of the message in its full-message format.

When the message notification application 110 is displaying an e-mail notification, the e-mail notification application can work with one or more e-mail service providers. The server module of the back-end server 336 can receive the incomplete data set, associated with an e-mail message, from the partner application 225 for the search query terms. The server module can send the search query terms to the application programming interfaces of the e-mail servers 330 of the one or more e-mail service providers.

The server module of the back-end server 336 can put the incomplete data set into a format and schema of an application programming interface for each of the e-mail service providers. Thus, the server module can put the incomplete data set into a format and schema of an application programming interface for both a first e-mail service provider, such as Yahoo!® mail, and a second e-mail service provider, such as Gmail™, when communicating with the corresponding e-mail service provider. The server module can communicate with e-mail servers 330. For example, the server module of the back-end server 336 can communicate with the application programming interface of a first e-mail service provider with the incomplete data set as search query terms in order for the e-mail server 330A to retrieve an instance of the e-mail message in its full-message format from the first e-mail service provider.

Figure 3B:
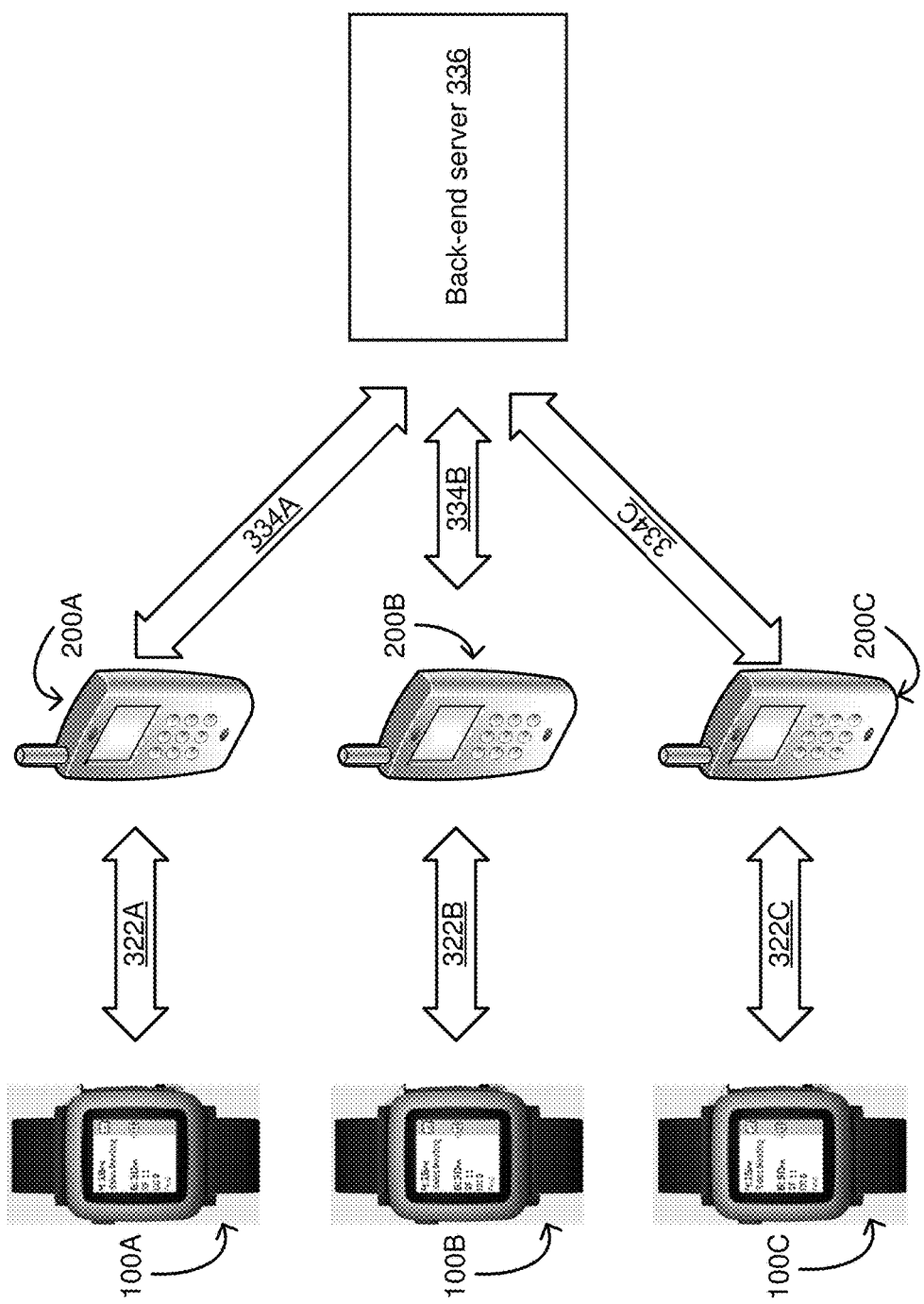
FIG. 3B illustrates communication channels for requests and responses in the system between instances of the message notification application and the back-end server in accordance with some embodiments.

FIG. 3B illustrates communication channels for requests and responses in the system between instances of the message notification application and the back-end server in accordance with some embodiments. As shown, a number of wearable electronic devices such as 100A, 100B, and 100C can be respectively communicatively coupled to a number of mobile computing devices such as 200A, 200B, and 200C through a number of wireless connections 322A, 322B, and 322C. Thus, each of the wearable electronic devices 100A, 100B, and 100C and their respective mobile computing devices 200A, 200B, and 200C can send and receive signals from each other such as requests and responses through the wireless connections 322A, 322B, and 322C. An instance of the message notification application on each of the wearable electronic devices 100A, 100B, and 100C may communicate with the back-end server 336. Like the mobile device 200 of FIG. 3A, each of the mobile devices 200A, 200B, and 200C, in turn, can be communicatively coupled though a number of different connections to a number of different devices and/or systems for sending and receiving signals from each other as requests and responses. With the foregoing understanding, the mobile computing devices 200A, 200B, and 200C of FIG. 3B are simply illustrated as communicatively coupled to the back-end server 336 through respective connections 334A, 334B, and 334C for circumventing the limitations imposed by the proprietary systems. Additionally or alternatively, the wearable electronic devices such as 100A, 100B, and 100C can be communicatively coupled through a wireless connection (e.g., the wireless connection 323 of FIG. 3A) to the back-end server 336.

Figure 3C:
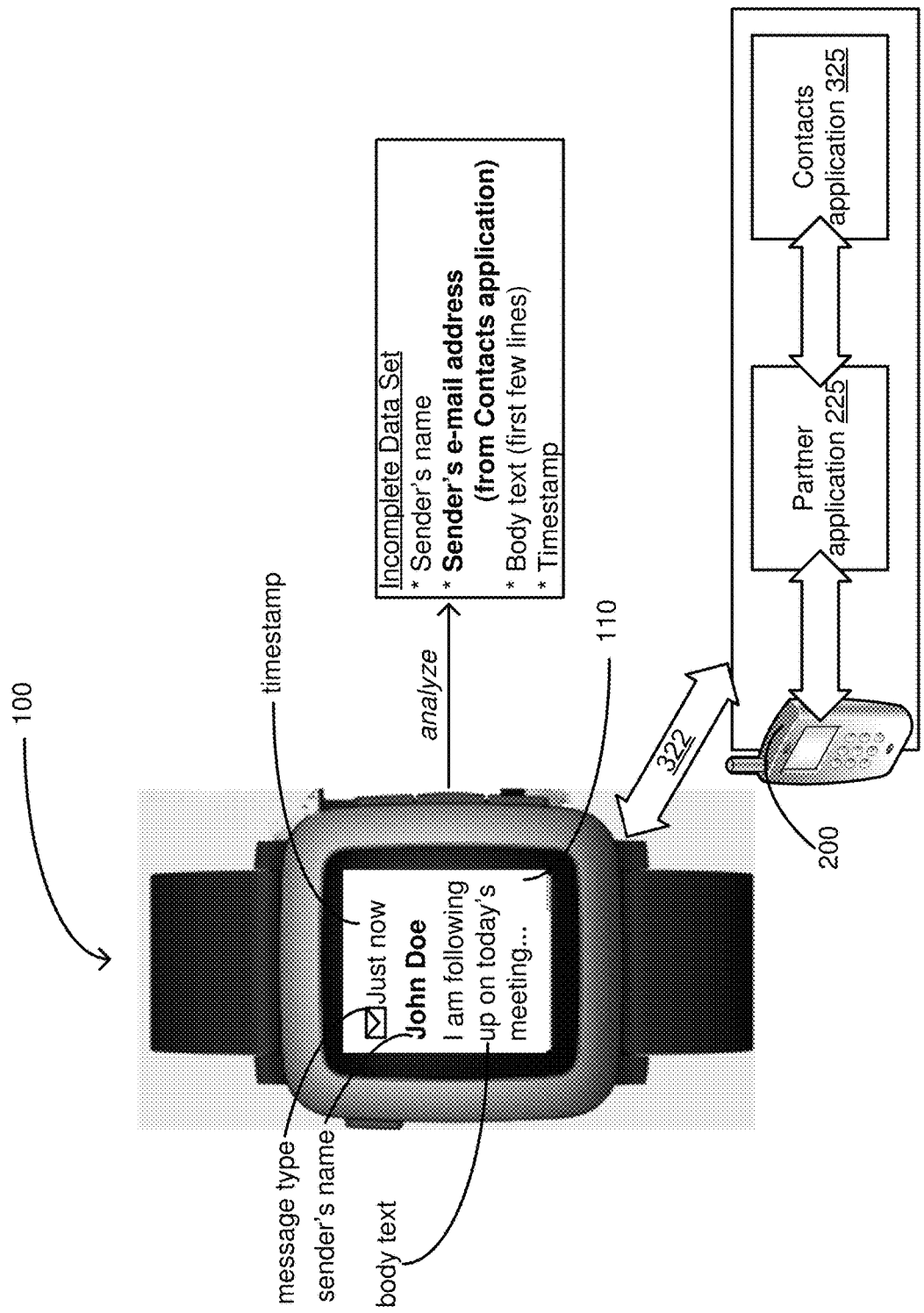
FIG. 3C illustrates a wearable electronic device showing a message notification in a message notification application in accordance with some embodiments.

FIG. 3C illustrates the wearable electronic device 100 showing a message notification in a message notification application 110 in accordance with some embodiments. As provided in reference to FIG. 1A, the message notification can have a data set of information or content from a message such as a message type, a timestamp, a sender's name, and some body text such as the first few lines of the message. In addition, the wearable electronic device 100 can fetch additional sender information such as a sender's e-mail address or phone number in a contacts application 325 (via the partner application 225) on the mobile computing device 200 through the wireless connection 322. The message notification application 110 can search the message notification for metadata, such as the names in the sender's line, and use that information in a first algorithm to pass that information to the partner application 225 on the mobile computing device 200. The partner application 225 on the mobile computing device 200 can use the information to do a reverse look-up on various fields in the contact list of the mobile computing device 200. In an embodiment, the partner application 225 on a smart phone can use the information, such as the metadata, from a smart watch and perform a reverse look-up on various fields in the contact list of the smart phone. The fields of the contact list can include a matching first name or last name to the name of the e-mail sender, a matching e-mail address to the e-mail address taken from the notification, or other information. The partner application 225 can then find one or more possible listed contacts that substantially match and present a user interface to ask the user of the wearable device to identify the one or more specific recipients that the email should be responded to. The user-interface can present these options of potential recipients to the user of the wearable electronic device and allow the user to select the one or more proper recipients that the e-mail reply should be delivered to without having to leave the message notification application. Note, analysis of the message notification in combination with the additional sender information from the contact application 325 can form the incomplete data set associated with the message. As shown, the incomplete data set can have the sender's name, the sender's e-mail address, some body text such as the first few lines of the message, and the timestamp.

The incomplete data set can be used as search query terms to bring back an actual instance of the message from the message service. The search results from the message service may bring back instances of multiple different messages that substantially match the query terms of the incomplete data set.

Figure 4A:
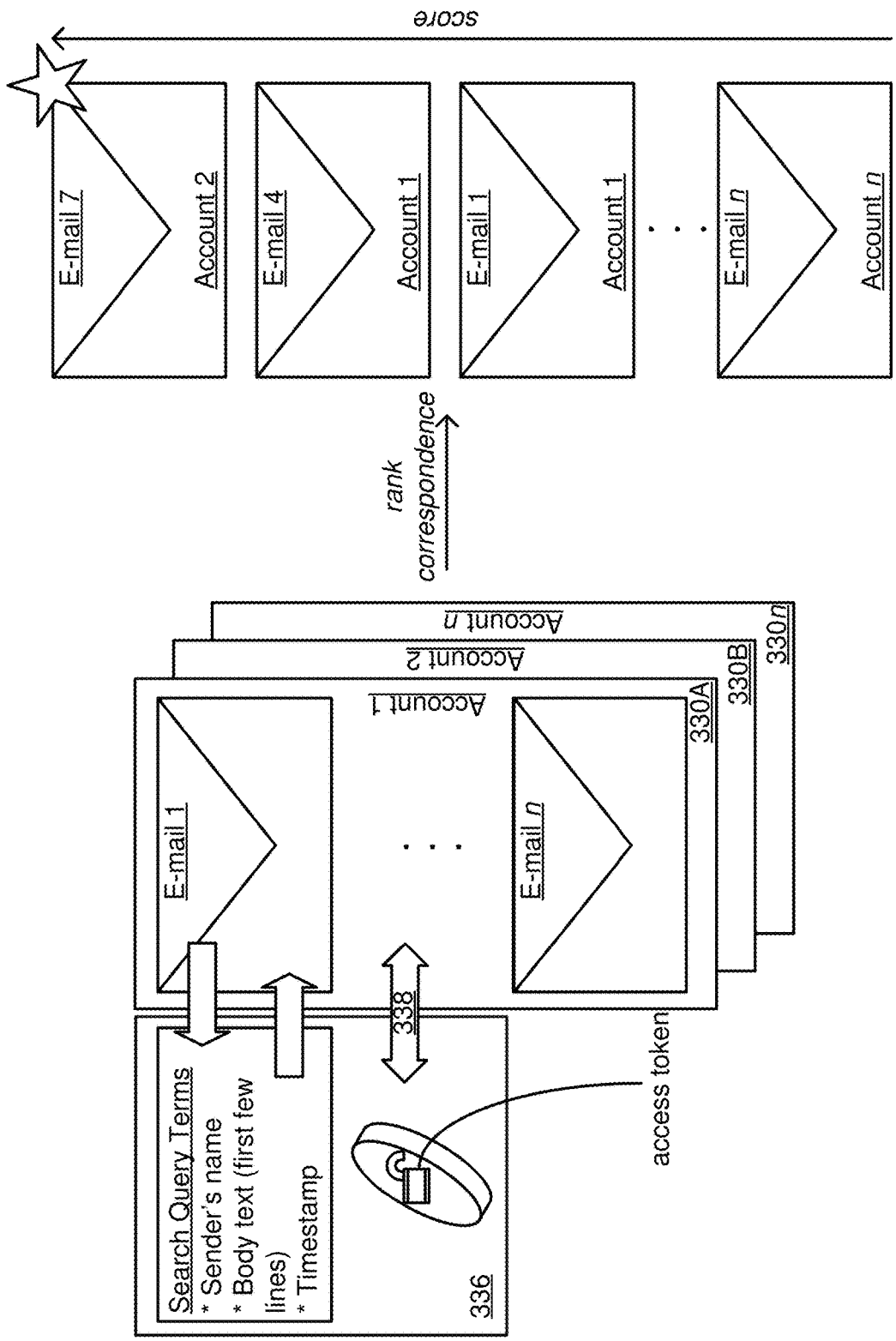
FIG. 4A illustrates rank ordering of messages for taking action in accordance with some embodiments.

FIG. 4A illustrates rank ordering of messages for taking action in accordance with some embodiments. As shown, the back-end server 336 or a server module thereof may provide the incomplete data set in a search query as search query terms to at least the first message server 330A for at least a first account through the connection 338. For example, the a server module of a back-end server 336 may provide the incomplete data set associated with FIG. 1A in a search query as search query terms to at least a first e-mail server for at least a first e-mail account through the first connection 338A. The server module may put the incomplete data set into a format and schema associated with an application programming interface for at least the first message server 330A. The server module may reference a database of formats and schemas for each of the message servers 330 and select the appropriate one.

As shown, an access token (unencrypted) authorizing access to at least the first message server 330A can also accompany the incomplete data set.

As further shown in FIG. 4A, the back-end server 336 or the server module thereof may further provide the incomplete data (e.g., the incomplete data set associated with FIG. 1A) in search queries as search query terms to a second message server 330B up to the n$^{th}$ message server 330n (e.g., e-mail message servers) for a second account up to an n$^{th}$ account (e.g., e-mail accounts) through the connection 338. For example, the back-end server 336 or the server module thereof may further provide the incomplete data set associated with FIG. 1A in search queries as search query terms to a second e-mail server up to an n$^{th}$ e-mail server for a second e-mail account up to an n$^{th}$ e-mail account through the connection 338. While FIG. 4A shows one account per message server, the user of the wearable electronic device can have multiple accounts on any one or more message servers. Thus, the user may have two Gmail™ e-mail accounts; and thus, both e-mail accounts on the G-mail™ servers might need to be searched in order to ensure an instance of the message is retrieved. Thus, the partner application 225 is configured to supply search query terms for both accounts to support multiple e-mail accounts with any one or more of the e-mail service providers.

The server module may put the incomplete data set into formats and schemas associated with application programming interfaces for the second message server 330B up to the n$^{th}$ message server 330n. In addition, access tokens (unencrypted) authorizing access to messaging accounts of that user on the second message server 330B up to the n$^{th}$ message server can accompany the incomplete data set.

As further shown in FIG. 4A, the back-end server 336 or the partner application 225 may rank message hits returned from one or more search queries on one or more of the foregoing message servers 330 in terms of correspondence to the incomplete data set. In the e-mail example shown in FIG. 4A, E-mail 7 from the second account (e.g., Account 2) is scored the highest match to the incomplete data set. Thus, E-mail 7 is the most likely instance of the actual message corresponding to the notification on the wearable electronic device 100. Accordingly, this is the actual message the user wishes to take the selected actions on. Continuing with the e-mail example, if the user of the wearable electronic device 100 receives the message notification of FIG. 1A and selects the messaging action 102A (e.g. reply) of FIG. 1B, then E-mail 7 from the user's second account (e.g. Account 2) will be the message upon which the user takes action on and replies to.

As such, the server module of the back-end server 336 may match the incomplete data set against complete data sets for e-mail messages in their full-message formats on e-mail servers 330 of the one or more e-mail service providers.

Alternatively, instances of all of the full e-mail messages for each of the user's messaging accounts may be obtained on a periodic basis and stored in a database at the back-end server 336. The server module of the back-end server 336 can match the incomplete data set against complete data sets for e-mail messages in their full-message formats retrieved from the e-mail servers 330 and downloaded into a database on the back-end server 336.

Either way, the server module is configured to then rank match strengths for correspondence between the incomplete data set from the notification and the complete data sets of information in these stored e-mail messages.

For e-mail account authorization, the partner application 225 may send the incomplete data set with an access token in a packet format to an e-mail server of the one or more e-mail service providers. The access token conveys authentication of the user of the wearable electronic device 100 for an e-mail account on the e-mail server (e.g., e-mail server 330A). The back-end server 336 may send the incomplete data as search query terms along with the access token to enable a search method offered by the one or more e-mail service providers to identify the e-mail message.

Figure 4B:
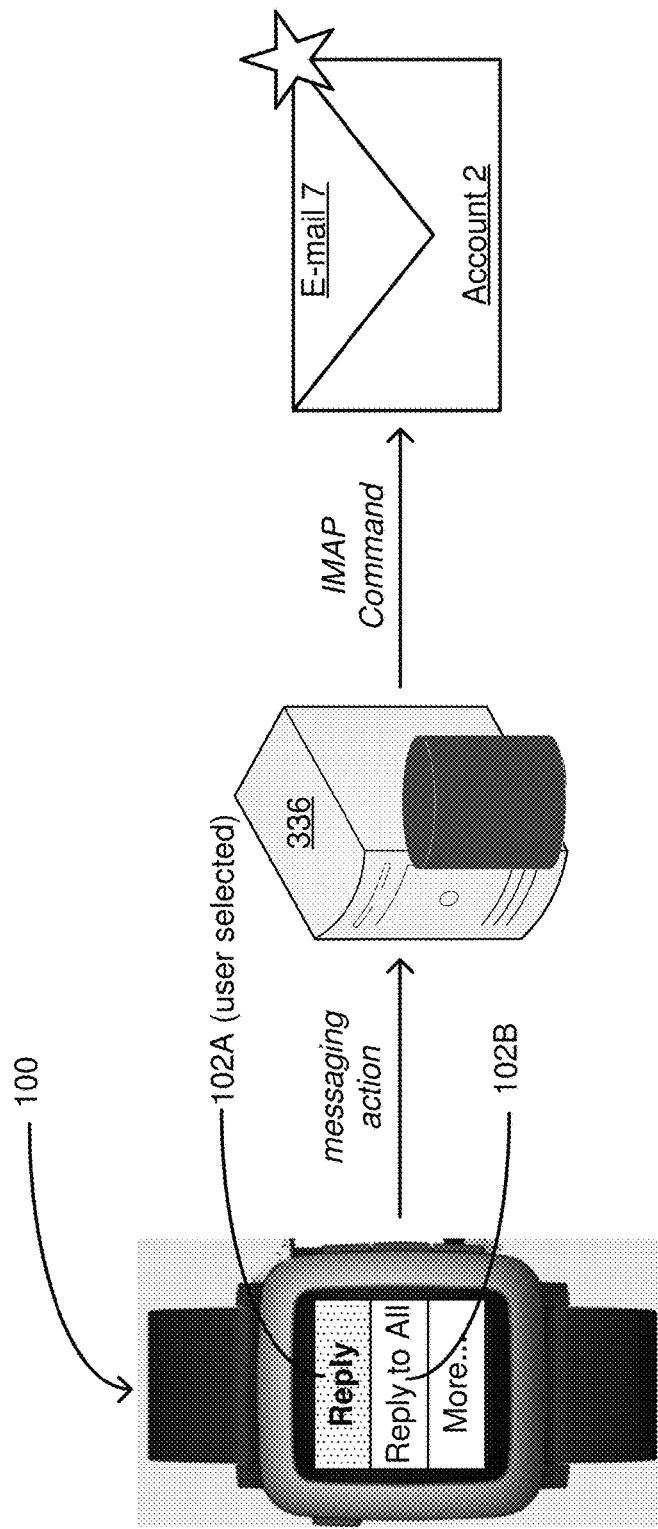
FIG. 4B illustrates taking action on a message in accordance with some embodiments.

FIG. 4B illustrates taking action on a message in accordance with some embodiments. Continuing with the above e-mail example, if the user of the wearable electronic device 100 receives the message notification of FIG. 1A and selects the messaging action 102A (e.g., reply) of FIG. 1B, then the wearable electronic device 100 sends the user-selected messaging action 102A to the back-end server 336, either directly or through the partner application 225. The back-end server 336, in turn, can convert the user-selected action 102A into an IMAP command for causing the selected action to be enacted on E-mail 7 from the user's second account or Account 2.

In view of the foregoing, the back-end server 336 may convert one or more user-selected messaging actions (e.g., messaging action 102A) respectively into one or more IMAP commands for use with the e-mail message with the highest match strength.

Figure 4C:
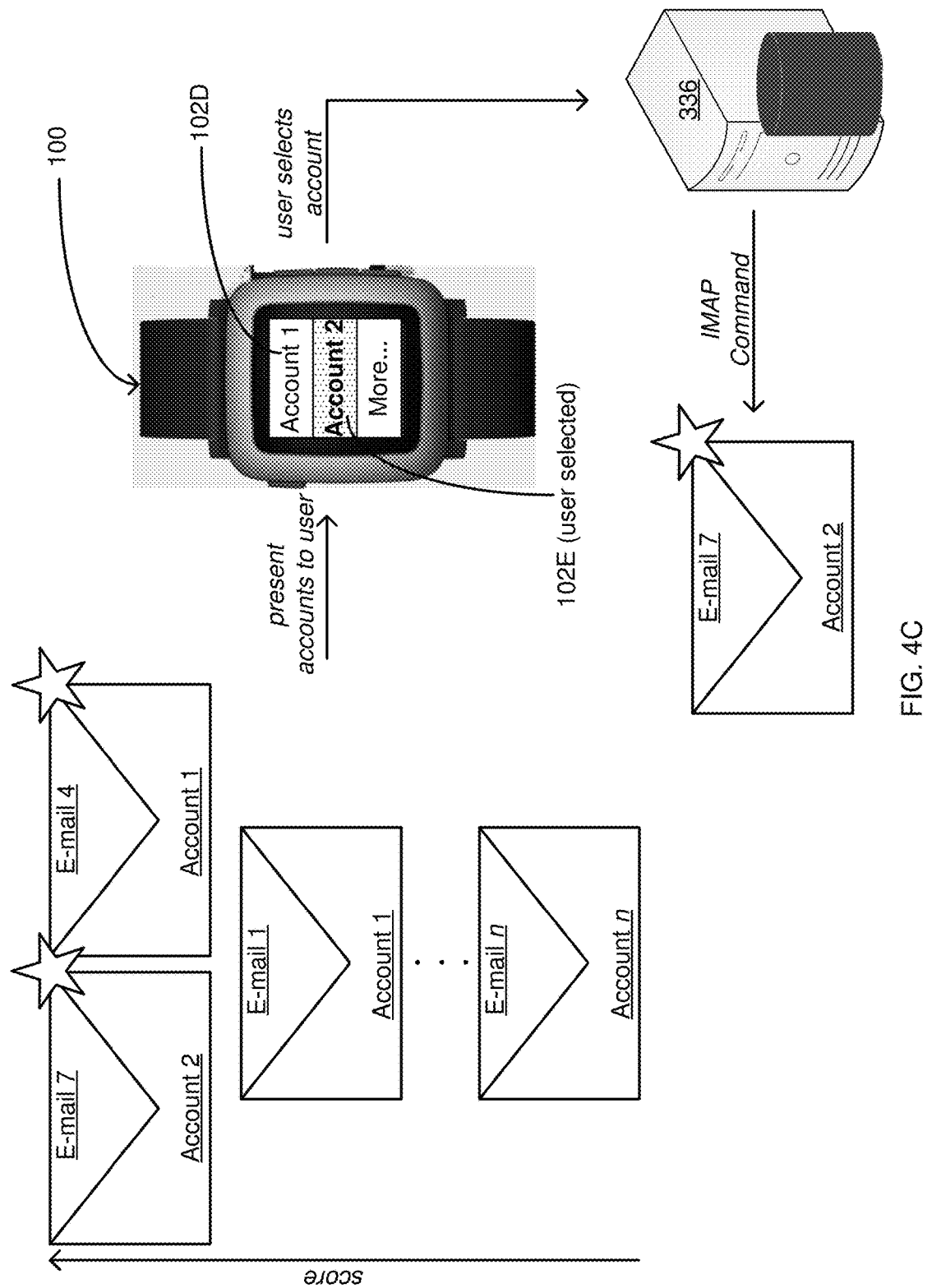
FIG. 4C illustrates rank ordering of messages and taking action on a message in accordance with some embodiments.

FIG. 4C illustrates rank ordering of messages and taking action on a message in accordance with some embodiments. As provided in reference to FIG. 4A, the back-end server 336 may rank message hits returned from one or more search queries on one or more of the message servers in terms of correspondence to the incomplete data set. While FIG. 4A shows an example in which one message is scored highest, it is possible for any of a number messages from any of a number of accounts to return equivalent scores. In such a scenario, the user of the wearable electronic device 100 can be prompted for input on the message and/or account upon which to take action.

In the e-mail example shown in FIG. 4C, E-mail 7 from the second account (e.g., Account 2) is tied with E-mail 4 from the first account (e.g., Account 1) for the highest score. If the user of the wearable electronic device 100 receives the message notification of FIG. 1A and selects the messaging action 102A (e.g., reply) of FIG. 1B, then the wearable electronic device 100 can present the user with a user interface presenting e-mail account options 102D and 102E to obtain direction on which e-mail to apply the messaging action 102A on, the first account (E-mail 4) or the second account (E-mail 7). If the user of the wearable electronic device 100 selects the user option 102E for the second account (E-mail 7), the wearable electronic device 100 may send the user-selected messaging action 102A to the back-end server 336 for the second account (E-mail 7). The back-end server 336, in turn, may convert the user-selected action 102A into an IMAP command for operating on E-mail 7 from the user's second account (e.g., Account 2).

In view of the foregoing, the message notification application 110 may present a user interface that requests user input on selecting an appropriate e-mail account from a presented list of e-mail accounts to assist with carrying out the one or more messaging actions 102 when merely multiple low or tied match strengths e-mail messages are returned. In an embodiment, the message notification application 110 may store in an encrypted form the details on the e-mail accounts that the user of the wearable electronic device has.

Additionally or alternatively, the partner application 225 may support multiple e-mail accounts with each of the one or more of the e-mail service providers. The back-end server 336 and/or the partner application 225 may store in an encrypted form the details on the e-mail accounts that the user of the wearable electronic device 100 has. The partner application 225 may allow the user of the wearable electronic device 100 to choose an appropriate e-mail account from the multiple e-mail accounts for implementing the messaging actions 102 on the appropriate e-mail account.

Figure 5A:
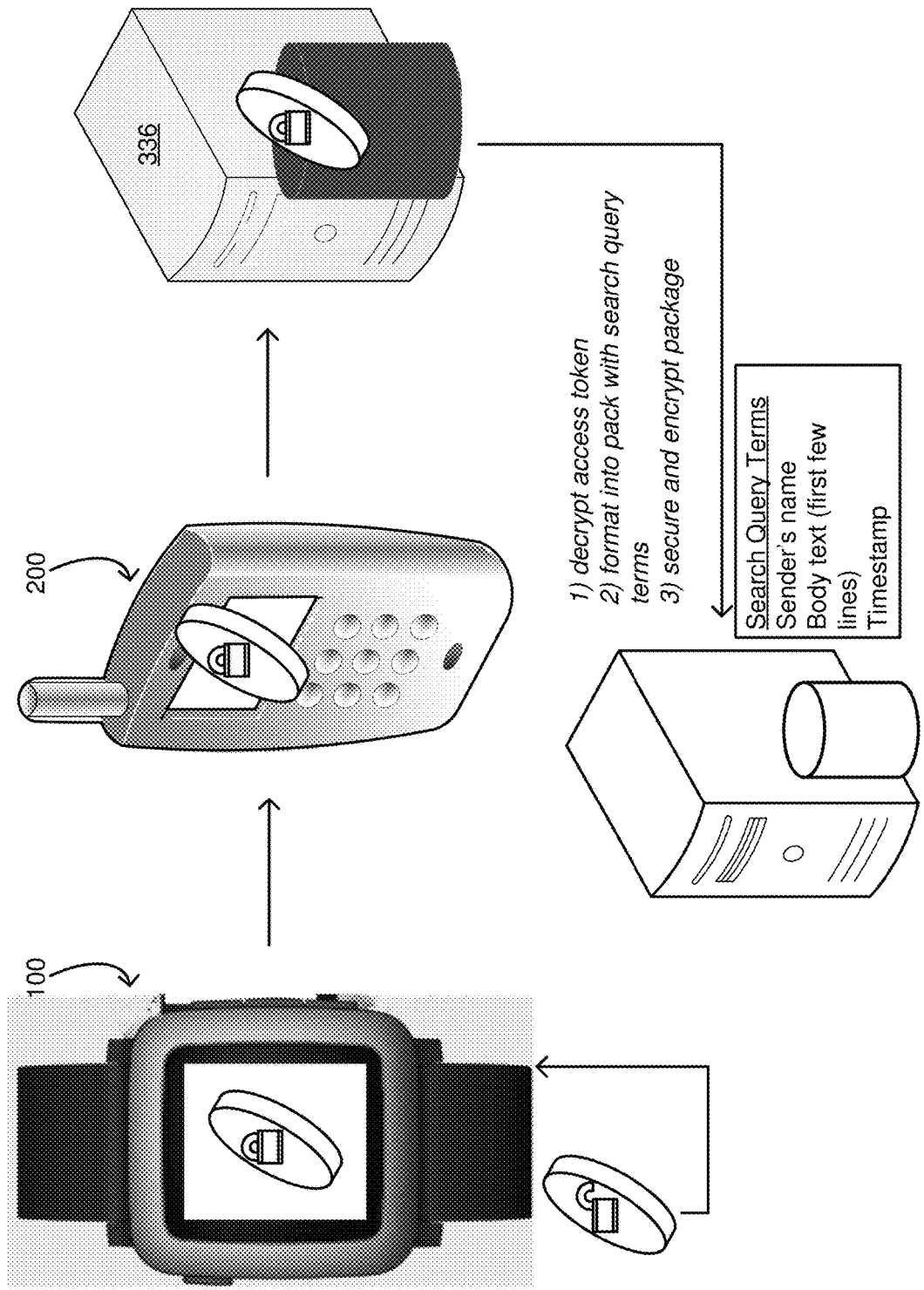
FIG. 5A illustrates access token encryption and decryption in accordance with some embodiments.

FIG. 5A illustrates access token encryption and decryption in accordance with some embodiments. As shown, the wearable electronic device 100 may encrypt an access token to provide an encrypted access token for a protected resource such as an account on a message server (e.g., an e-mail account on an e-mail server). The wearable electronic device 100 may send the encrypted access token and the incomplete data set to the mobile computing device 200 through the wireless connection 322 (FIG. 3A). The mobile computing device 200, in turn, may send the encrypted access token and the incomplete data set to the back-end server 336 through the wireless or cellular connection 324 (FIG. 3A). Having securely transmitted the access token for the protected resource to the back-end server 336, the back-end server 336 may decrypt the access token to provide an unencrypted access token for use with the protected resource of the messaging service. As provided in FIG. 4A, the back-end server 336 may provide the unencrypted access token with the incomplete data set in the format and schema associated with the application programming interface needed to access and communicate with that protected resource (e.g., the first message server 330A).

The mobile computing device 200 (e.g., smart phone) may encrypt the access token to store an encrypted access token on the mobile computing device 200. The mobile computing device 200 may merely unencrypt the access token when sending the unencrypted access token to the back-end server 336 with the incomplete data set as search query terms with the partner application 225. The back-end server 336 may then send the unencrypted access token to the one or more e-mail service providers.

Figure 5B:
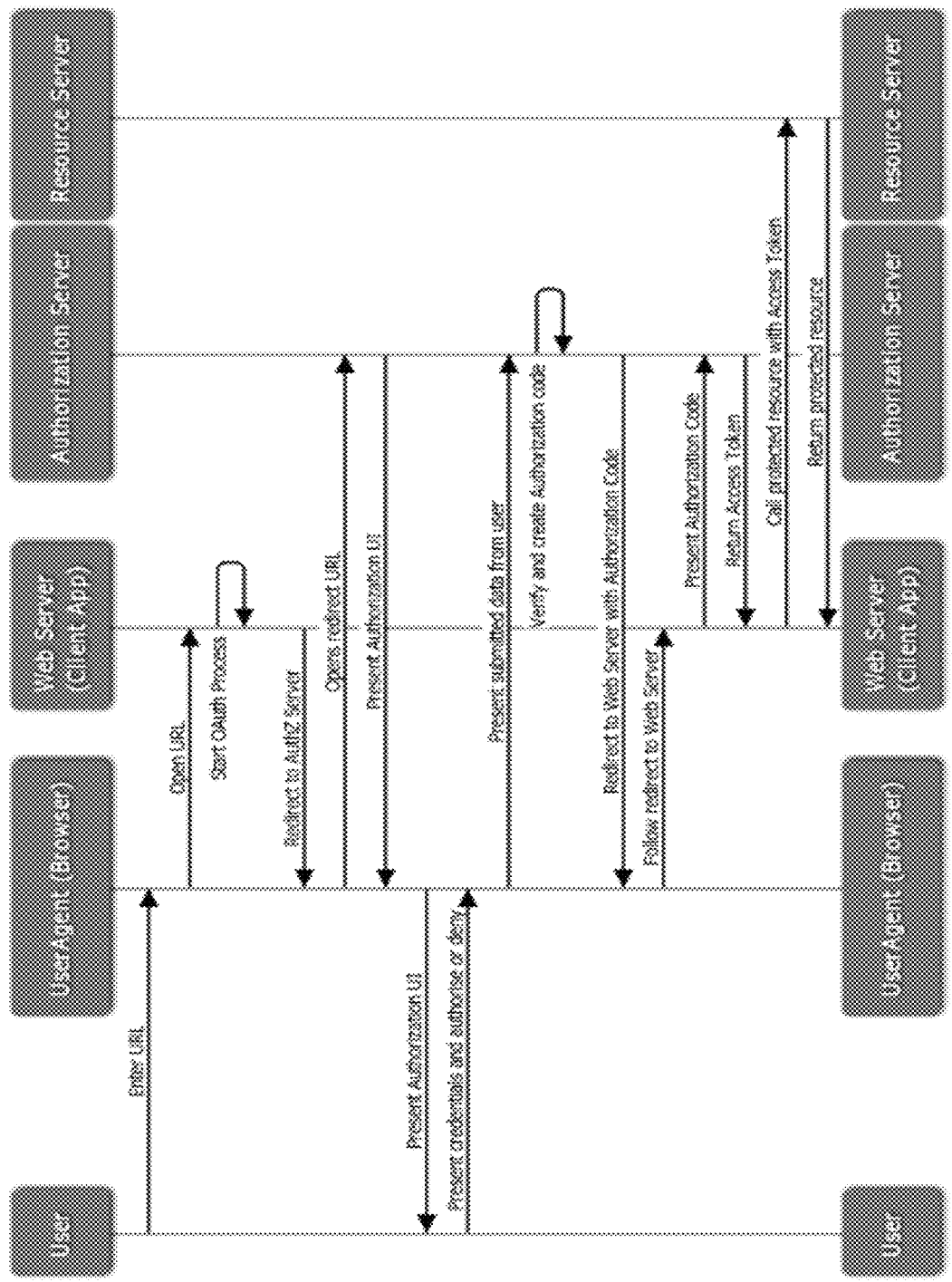
FIG. 5B illustrates authentication and authorization using an example authorization protocol in accordance with some embodiments.

FIG. 5B illustrates authentication and authorization using an example authentication protocol, such as the OAuth 2.0 protocol, in accordance with some embodiments.

Figure 7:
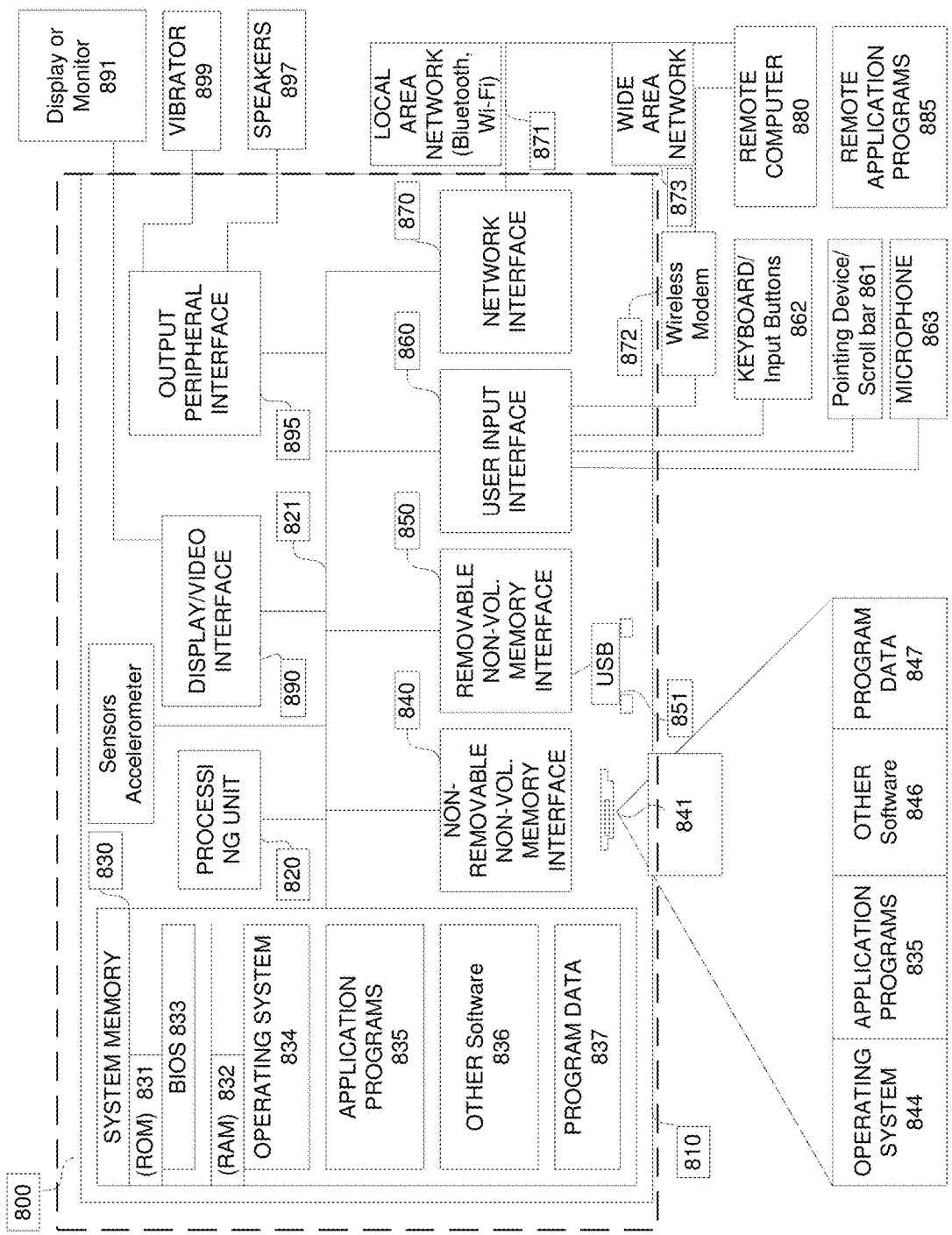
FIG. 7 illustrates a computing system that can be part of one or more of the wearable electronic devices in accordance with some embodiments.

In general, the wearable electronic device includes one or more systems and can be coupled to one or more networks. FIGS. 7 and 8 illustrate additional example environments to implement the concepts.

Figure 6:
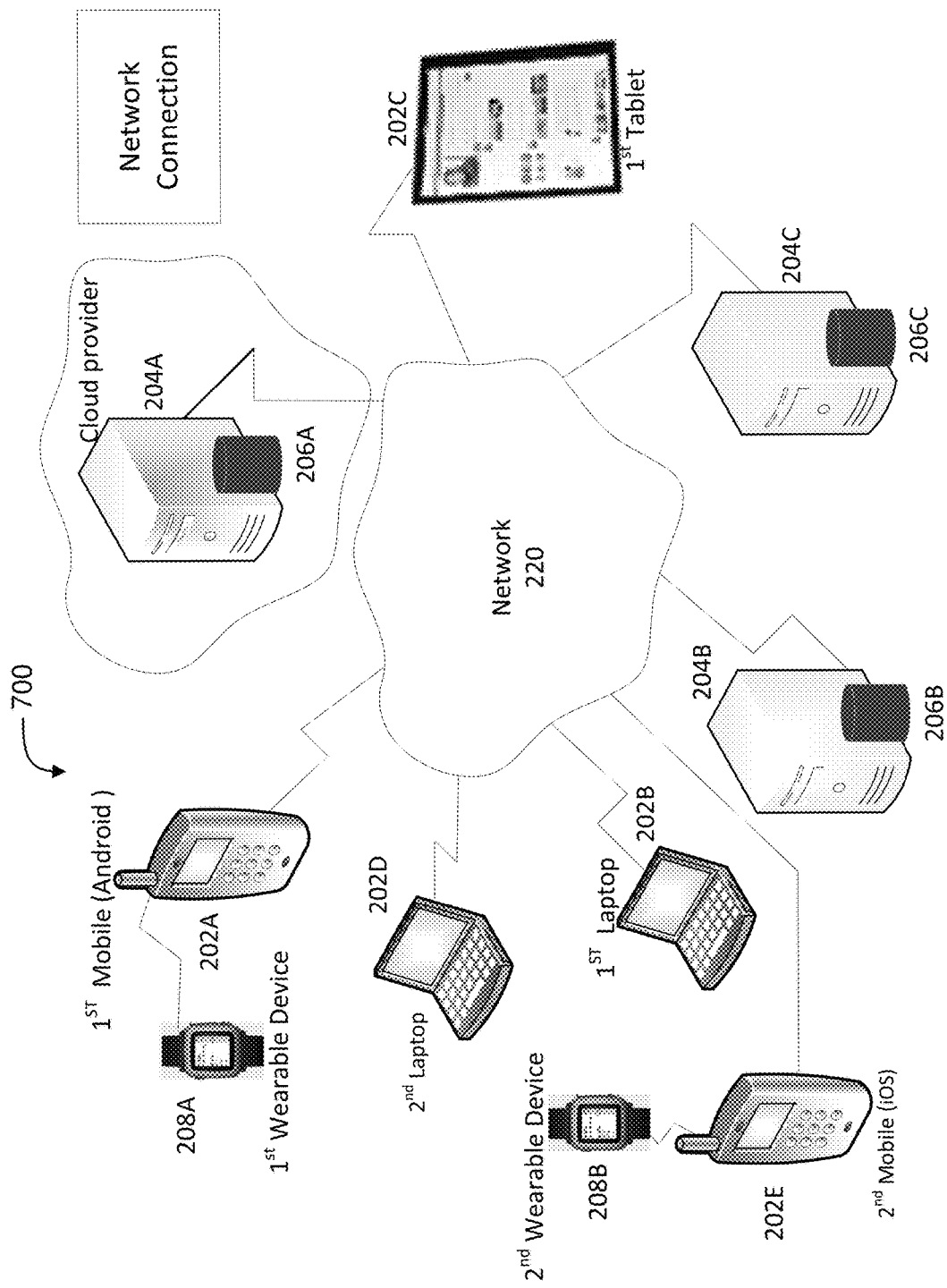
FIG. 6 illustrates remote access and/or communication by a wearable electronic device to other devices on a network in accordance with some embodiments.

FIG. 6 illustrates remote access and/or communication by a wearable electronic device to other devices on a network in accordance with some embodiments. The network environment 700 has a communications network 220 that connects server computing systems 204A through 204C, and at least one or more client computing systems 202A to 202F. As shown, there may be many server computing systems 204A through 204C and many client computing systems 202A to 202F connected to each other via the network 220, which may be, for example, the Internet. Note, that alternatively the network 220 might be or include one or more of: an optical network, a cellular network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the server computing systems 204A and 204-B, and the client computing systems 202A and 202C may be viewed as peer-to-peer if each such communicating device is capable of initiation and response to communication. Additionally, server computing systems 204A-204C also have circuitry and software to communication with each other across the network 220. One or more of the server computing systems 204A to 204C may be associated with a database such as, for example, the databases 206A to 206C. Each server may have one or more instances of a virtual server running on that physical server and multiple virtual instances may be implemented by the design. A firewall may be established between a client computing system 202C and the network 220 to protect data integrity on the client computing system 202C. Each server computing system 204A-204C may have one or more firewalls.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device as well as a web-browser application resident on the client device. The cloud-based remote access for a wearable electronic device, can be accessed by a mobile device, a desktop, a tablet device, and other similar devices, anytime, anywhere. Thus, the cloud-based remote access to a wearable electronic device hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 204A may include a server engine, a page management component or other network user interface component, such as a mobile application or wearable device application managing component, a content management component, and a database management component. The server engine performs basic processing and operating system level tasks. The page management component handles creation and display or routing of web pages or other interface screens associated with receiving and providing digital content and/or digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, apps, services, processes, and other similar software executable when executed on the server computing system 204A, causes the server computing system 204A to display windows and user interface screens on a portion of a media space, such as a web page. A user from the client computing system 202A may interact with the web page, and then supply input to the query/fields and/or service presented by a user interface of the application. The page may be served by a server computing system 204A on any Hypertext Markup Language (HTML) or Wireless Access Protocol (WAP) enabled client computing system 202A or any equivalent thereof. For example, the client mobile computing system 202A may be a wearable electronic device, smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

FIG. 7 illustrates a computing system that can be part of one or more of the wearable electronic devices in accordance with some embodiments. With reference to FIG. 7, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. Transitory media such as wireless channels are not included in the machine-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 7 illustrates that RAM can include a portion of the operating system 834, other executable software 836, and program data 837.

The computing system 810 may also include other removable/non-removable volatile/nonvolatile computer storage media. By way of example only, FIG. 7 illustrates a solid-state memory 841. Other removable/non-removable, volatile/nonvolatile computer storage media that can be used in the exemplary operating environment include, but are not limited to, USB drives and devices, flash memory cards, solid state RAM, solid state ROM, and the like. The solid-state memory 841 is typically connected to the system bus 821 through a non-removable memory interface such as interface 840, and USB drive 851 is typically connected to the system bus 821 by a removable memory interface, such as interface 850.

As an example, the computer readable storage medium 841 stores Operating System software for smart watches to cooperate with both Android OS and iOS.

The drives and their associated computer storage media discussed above and illustrated in FIG. 7, provide storage of computer readable instructions, data structures, other executable software and other data for the computing system 810. In FIG. 7, for example, the solid state memory 841 is illustrated for storing operating system 844, other executable software 846, and program data 847. Note that these components can either be the same as or different from operating system 834, other executable software 836, and program data 837. Operating system 844, other executable software 846, and program data 847 are given different numbers here to illustrate that, at a minimum, they are different copies. In an example, the operating system, Pebble OS, can be a customized Free RTOS kernel that can communicate with Android and iOS apps using Bluetooth, Wi-Fi, cellular or other communication methodology.

A user may enter commands and information into the computing system 810 through input devices such as a keyboard, touchscreen, or even push button input component 862, a microphone 863, a pointing device and/or scrolling input component 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a display and video interface 890. In addition to the display monitor, computing devices may also include other peripheral output devices such as speakers 897, a vibrator 899, and other output device, which may be connected through an output peripheral interface 890.

The computing system 810 may operate in a networked environment using logical connections to one or more remote computers/client devices, such as a remote computing device 880. The remote computing device 880 may be a wearable electronic device, a personal computer, a handheld device, a server, a router, a network PC, a peer device or other common network node, and typically includes many or all of the elements described above relative to the computing system 810. The logical connections depicted in FIG. 7 include a local area network (LAN) 871 and a wide area network (WAN) 873, but may also include other networks. Such networking environments are commonplace in offices, enterprise-wide computer networks, intranets and the Internet. A browser application as well as other applications may be resident on the computing device and stored in the memory.

It should be noted that the present design can be carried out on a computing system such as that described with respect to FIG. 7. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

FIGS. 9A, 9B, and 9C respectively illustrate methods 900A, 900B, and 900C for taking action on message notifications using an incomplete data set regarding a notification from within the message notification application in accordance with some embodiments. The methods and the steps thereof can be performed out of literal order when logically possible. Data and routines of the methods can be stored on any combination of a memory of the wearable electronic device 100, the mobile computing device 200, the back-end server 336, or one or more of the message servers 330. The steps of the methods can be executed on any combination of the wearable electronic device 100, the mobile computing device 200, the back-end server 336, or one or more of the message servers 330 when logically possible.

Figure 8A:
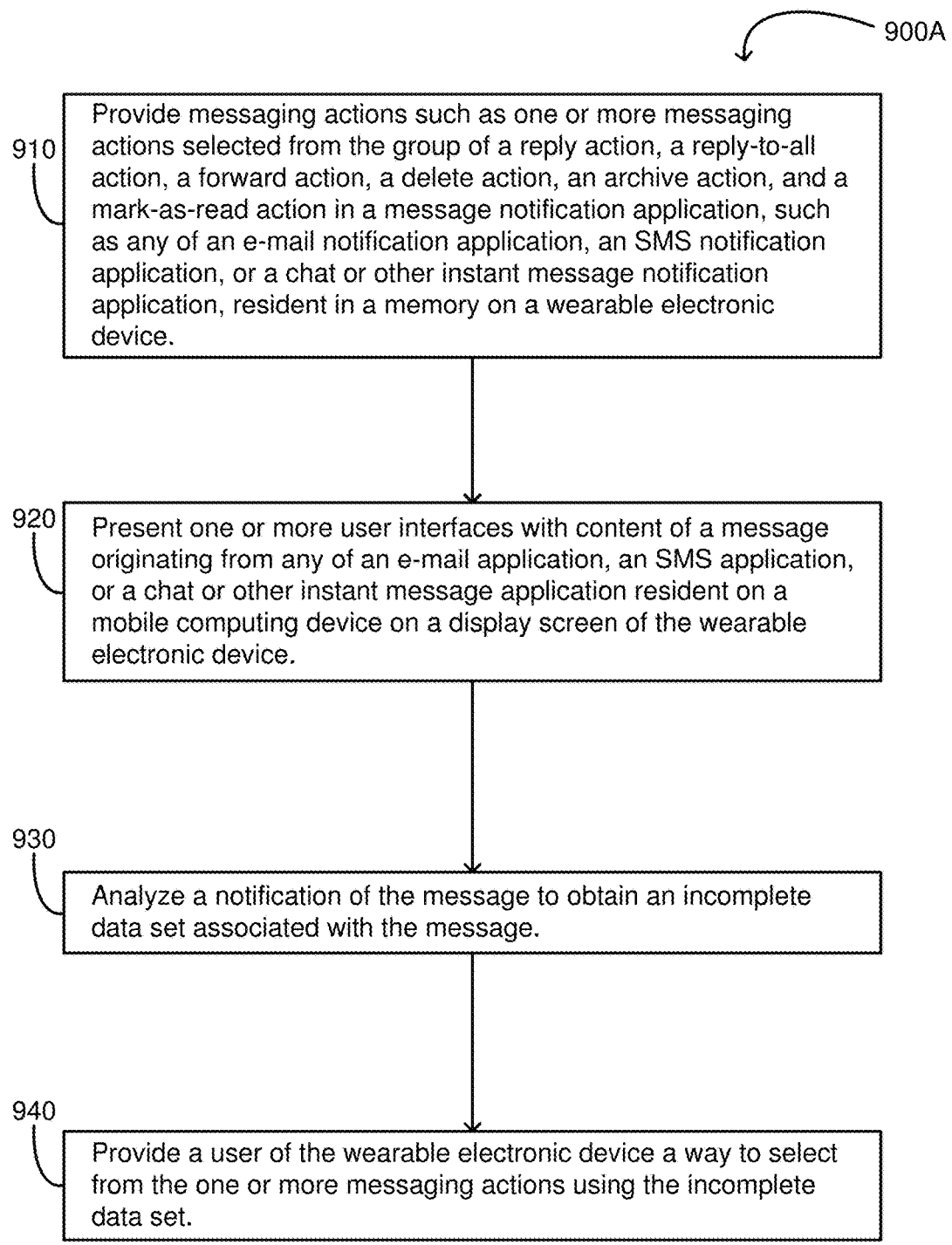
FIG. 8A illustrates a method for taking action on message notifications using an incomplete data set in accordance with some embodiments.

FIG. 8A illustrates the method 900A having a first step 910 of providing messaging actions such as one or more messaging actions selected from the group of a reply action, a reply-to-all action, a forward action, a delete action, an archive action, and a mark-as-read action in a message notification application. The message notification application can be any of an e-mail notification application, an SMS notification application, a chat or other instant message notification application, or a similar application resident in a first memory on a wearable electronic device. FIG. 1B provides an example of one or more messaging actions from a message notification application 110 on a wearable electronic device 100 (e.g., watch).

The method 900A has a second step 920 of presenting one or more user interfaces with content of a message originating from any of an e-mail application, an SMS application, or a chat or other instant message application resident on a mobile computing device. The content of the message can be on a display screen of the wearable electronic device. FIG. 1A provides an example of a user interface with content of a message on a wearable electronic device 100.

The method 900A has a third step 930 of analyzing a notification of the message to obtain an incomplete data set associated with the message. FIG. 1A provides an example of an incomplete data set associated with a message.

The method 900A has a fourth step 940 of providing a user of the wearable electronic device a way to select from the one or more messaging actions using the incomplete data set. FIG. 1B provides an example of a way to select from one or more messaging actions on a wearable electronic device 100.

Figure 8B:
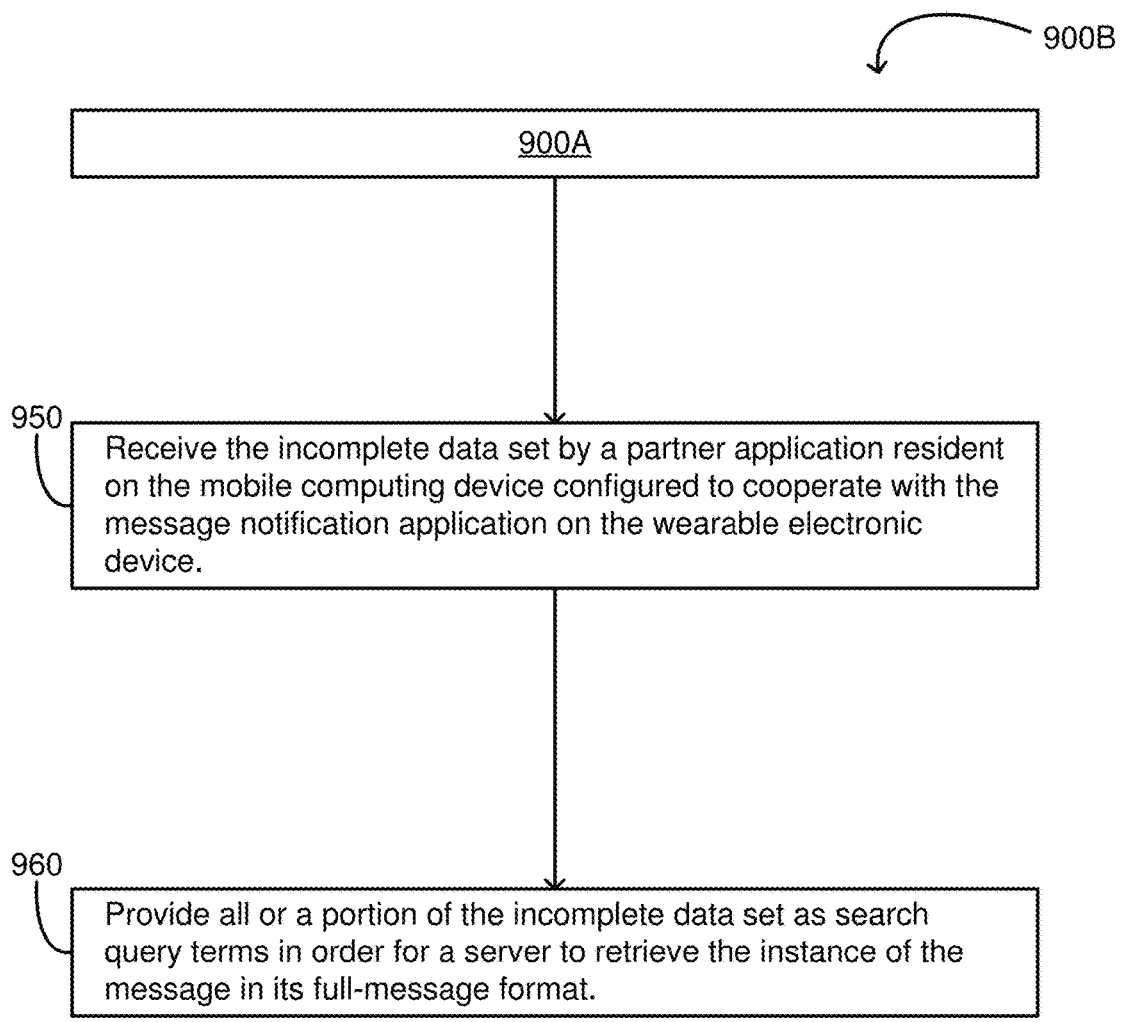
FIG. 8B illustrates a method for taking action on message notifications using an incomplete data set in accordance with some embodiments.

FIG. 8B illustrates the method 900B beginning with the method 900A. Following on the method 900A, the method 900B has a first step 950 of receiving the incomplete data set by a partner application resident in a second memory of the mobile computing device. The partner application can cooperate with the wearable device application on the wearable electronic device. FIG. 2 provides an example of a partner application 225 resident on a mobile computing device 200 (e.g., smart phone) cooperating with a wearable device application 210 on a wearable electronic device 100.

The method 900B has a second step 960 of providing all or a portion of the incomplete data set as search query terms in order for a server to retrieve the instance of the message in its full-message format. FIGS. 3A and 4A provide an example of a back-end server 336 providing an incomplete data set as search query terms to retrieve an instance of a message in its full-message format.

Figure 8C:
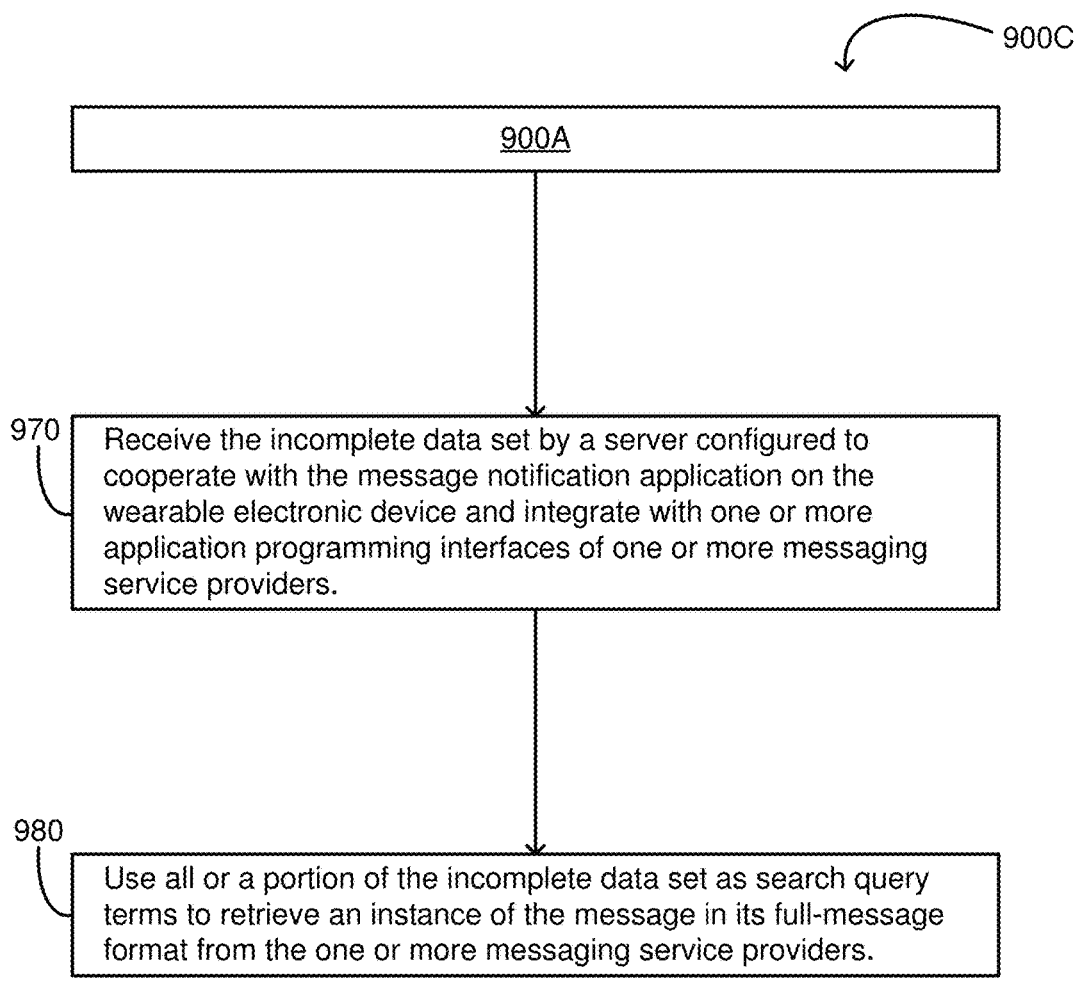
FIG. 8C illustrates a method for taking action on message notifications using an incomplete data set in accordance with some embodiments.

FIG. 8C illustrates the method 900C beginning with the method 900A. Following on the method 900A, the method 900C has a first step 970 of receiving the incomplete data set by a server configured to cooperate with the message notification application on the wearable electronic device. The server is also configured to integrate with one or more application programming interfaces of one or more messaging service providers. FIG. 3A provides an example of a back-end server 336 configured to cooperate with a wearable device application 210 (FIG. 2) on a wearable electronic device 100.

The method 900C has a second step 980 of using all or a portion of the incomplete data set as search query terms to retrieve an instance of the message in its full-message format from the one or more messaging service providers. FIGS. 3A and 4A provide an example of a back-end server 336 using an incomplete data set as search query terms to retrieve an instance of a message in its full-message format.

Figure 9:
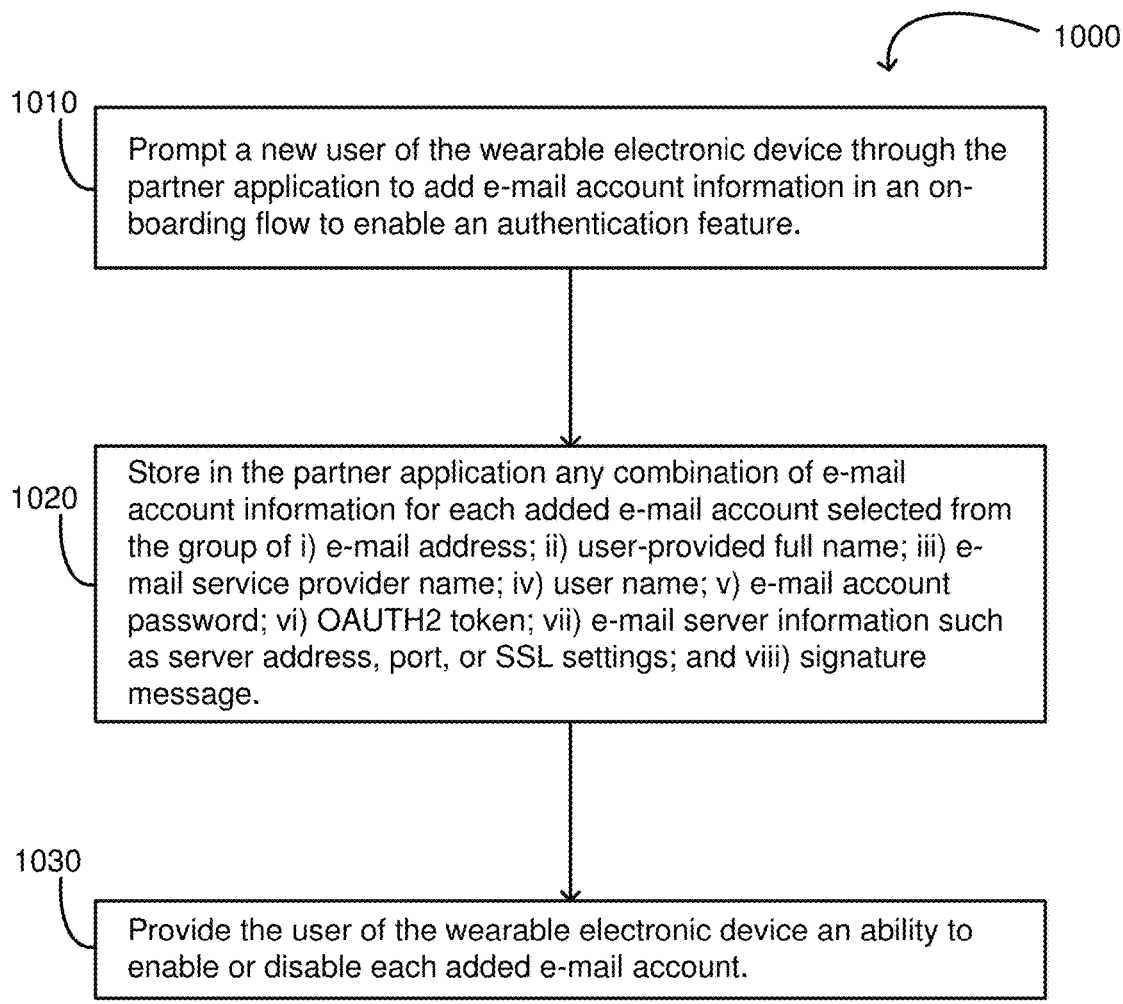
FIG. 9 illustrates a method for on-boarding a new user in order to allow the user to take action on message notifications in accordance with some embodiments.

FIG. 9 illustrates a method 1000 for on-boarding a new user in order to allow the user to take action on message notifications in accordance with some embodiments. FIG. 9 illustrates the method 1000 having a first step 1010 of prompting a new user of the wearable electronic device through the partner application to add e-mail account information in an on-boarding flow to enable an authentication feature. FIG. 2 provides an example of wearable electronic device 100 (e.g., watch) and a partner application 225 on a mobile computing device 200 (e.g., smart phone). An example of the e-mail account information to enable the authentication feature is provided in the method 1000 in a second step 1020: Storing in the partner application any combination of e-mail account information for each added e-mail account selected from the group of i) e-mail address; ii) user-provided full name; iii) e-mail service provider name; iv) user name; v) e-mail account password; vi) OAUTH2 token; vii) e-mail server information such as server address, port, or SSL settings; and viii) signature message. The method 1000 has a third step 1030 of providing the user of the wearable electronic device an ability to enable or disable each added e-mail account.

In one embodiment, the software used to facilitate the algorithms discussed herein can be embodied onto a non-transitory machine-readable medium. A machine-readable medium includes any mechanism that stores information in a form readable by a machine (e.g., a computer). For example, a non-transitory machine-readable medium includes read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the design have been shown the design is not to be limited to these embodiments. For example, most functions performed by electronic hardware components can be duplicated by software emulation. Thus, a software program written to accomplish those same functions can emulate the functionality of the hardware components in input-output circuitry. The design is to be understood as not limited by the specific embodiments described herein, but only by scope of the appended claims.

What is claimed is:

1. An apparatus, comprising: a message notification application, including any of an e-mail notification application, an SMS notification application, or a chat or other instant message notification application, resident in a first memory on a wearable electronic device, configured to provide messaging actions including two or more messaging actions selected from the group of a reply action, a reply-to-all action, a forward action, a delete action, an archive action, a flag action, and a mark-as-read action; where the message notification application is configured to allow a user to take one or more of the messaging actions regarding a notification from the message notification application; where the message notification application has one or more user interfaces to present content of a message of a message application selected from an e-mail application, an SMS application, or a chat or other instant message application resident on a mobile computing device, on a display screen of the wearable electronic device; where the message notification application is configured to analyze a notification of the message from the message application in order to obtain an incomplete data set associated with the message where the message notification application is configured to analyze a notification of the message from the message application in order to obtain an incomplete data set associated with the message coming from the message application resident on the mobile computing device, where the incomplete data set at least includes any two or more of i) a name of a sender of the message, some text from a body of the message, content in a subject line of the message, and a timestamp of the message; where the message notification application is configured to provide the user of the wearable electronic device a way to select from the two or more messaging actions using the incomplete data set; where the message notification application is configured to work with any of the group of i) a server configured to integrate with one or more application programming interfaces of one or more messaging service providers, where the server has a server module configured to receive the incomplete data set and use all or a portion of the incomplete data set as search query terms to retrieve an instance of the message in its full-message format from the one or more messaging service providers, ii) a partner application resident in a second memory of the mobile computing device configured to cooperate with the message notification application on the wearable electronic device, where the partner application is configured to receive the incomplete data set from the message notification application and then provide all or a portion of the incomplete data set as search query terms in order for the server module to retrieve the instance of the message in its full-message format, and iii) both i) and ii) above; and where any portions of the message notification application implemented in software is stored on a non-transitory computer-readable medium in an executable format.

2. The apparatus of claim 1,
where the message notification application is i) a combination of the partner application resident in the second memory of the mobile computing device and a wearable device application resident in the first memory of the wearable electronic device or ii) part of the wearable device application by itself.

3. The apparatus of claim 1,
where the message notification application is an e-mail notification application configured to work with one or more e-mail service providers,
where the message is an e-mail message,
where the server module is configured to receive the incomplete data set associated with the e-mail message from the partner application for the search query terms, and
where the server module is configured to send the search query terms to the one or more e-mail service providers.

4. The apparatus of claim 3,
where the server module is configured to put the incomplete data set into a format and schema of an application programming interface for a first e-mail service provider, as well as put the incomplete data set into a format and schema of an application programming interface for a second e-mail service provider when communicating with the second e-mail service provider, and where the server module is configured to communicate with the first e-mail service provider with the incomplete data set in order to retrieve an instance of the e-mail message in its full-message format from the first e-mail service provider.

5. The apparatus of claim 4, where the server module is configured to match the incomplete data set against complete data sets of e-mail messages in their full-message formats from the one or more e-mail service providers and then rank match strengths for correspondence between the incomplete data set and the complete data sets for the e-mail messages.

6. The apparatus of claim 5, where the server is configured to convert one or more user-selected messaging actions respectively into one or more Internet Message Access Protocol (IMAP) commands for use with the e-mail message with the highest match strength.

7. The apparatus of claim 6, where the message notification application is configured to present a user interface that requests user input on selecting an appropriate e-mail account from a presented list of e-mail accounts for carrying out the one or more messaging actions upon low or tied match strengths.

8. The apparatus of claim 3, where the server has its own e-mail database with e-mail messages retrieved and downloaded from the one or more e-mail service providers, where the server module is configured to match the incomplete data set against complete data sets for e-mail messages in their full-message formats in its own e-mail database and then rank match strengths for correspondence between the incomplete data set and the complete data sets of the e-mail messages that are retrieved and downloaded, where the server is configured to convert one or more user-selected messaging actions respectively into one or more IMAP commands for use with the e-mail message with the highest match strength, and where the server is configured to provide the one or more IMAP commands to e-mail servers of the one or more e-mail service providers with the corresponding e-mail message with the highest match strength.

9. The apparatus of claim 3, where the incomplete data set has two or more e-mail message-related fields selected from the group of i) a title or a subject line; ii) a sender's name; iii) a sender's e-mail address from a reverse look-up in a contacts application on the mobile computing device matching the sender's name; iv) one or more additional e-mail addresses respectively for additional e-mail message recipients from the reverse look-up; v) all or a portion of body text from the e-mail message; vi) a timestamp of receipt by an e-mail server; vii) a mobile application name that received the e-mail message; viii) any new content in the e-mail message the user of the wearable electronic device wants to send in the messaging action; and ix) any hidden data or characters embedded in the incomplete data set.

10. The apparatus of claim 9, where the partner application is configured to send the incomplete data set with an access token in a packet format to an e-mail server of the one or more e-mail service providers, where the access token conveys authentication of the user of the wearable electronic device for an e-mail account on the e-mail server, and where the server is configured to send the incomplete data as search query terms along with the access token to enable a search method offered by the one or more e-mail service providers to identify the e-mail message.

11. The apparatus of claim 10, where the wearable electronic device is a watch, and where the mobile computing device is a smart phone.

12. The apparatus of claim 11, where the watch is configured to encrypt the access token to provide an encrypted access token on the watch, where the smart phone is configured to send the encrypted access token to the server through the partner application, and where the server is configured to decrypt the encrypted access token prior to sending the access token to the one or more e-mail service providers.

13. The apparatus of claim 3, where the partner application is configured to support multiple e-mail accounts with any one or more of the e-mail service providers, and where the partner application is configured to allow the user of the wearable electronic device to choose an appropriate e-mail account from the multiple e-mail accounts for implementing the messaging actions on the appropriate e-mail account.

14. The apparatus of claim 3, where the partner application is configured to prompt a new user of the wearable electronic device to add e-mail account information in an on-boarding flow to enable an authentication feature, where the partner application is configured to store any combination of e-mail account information for each added e-mail account selected from the group of i) e-mail address; ii) user-provided full name; iii) e-mail service provider name; iv) user name; v) e-mail account password; vi) OAUTH2 token; vii) e-mail server information such as server address, port, or SSL settings; and viii) signature message, and where the partner application is configured to provide the user of the wearable electronic device an ability to enable or disable each added e-mail account.

15. The apparatus of claim 3, where the message notification application is configured to provide an option to dismiss the one or more messaging actions.

16. A method, comprising: providing messaging actions including one or more messaging actions selected from the group of a reply action, a reply-to-all action, a forward action, a delete action, an archive action, and a mark-as-read action in a message notification application, including any of an e-mail notification application, an SMS notification application, or a chat or other instant message notification application, resident in a first memory on a wearable electronic device; presenting one or more user interfaces with content of a message of a message application selected from an e-mail application, an SMS application, or a chat or other instant message application resident on a mobile computing device on a display screen of the wearable electronic device; analyzing a notification of the message from the message application in order to obtain an incomplete data set associated with the message where the message notification application is configured to analyze a notification of the message from the message application in order to obtain an incomplete data set associated with the message coming from the message application resident on the mobile computing device, where the incomplete data set at least includes any two or more of i) a name of a sender of the message, some text from a body of the message, content in a subject line of the message, and a timestamp of the message; providing a user of the wearable electronic device a way to select from the one or more messaging actions using the incomplete data set; where the message notification application is configured to work with any of the group of i) a server configured to integrate with one or more application programming interfaces of one or more messaging service providers, where the server has a server module configured to receive the incomplete data set and use all or a portion of the incomplete data set as search query terms to retrieve an instance of the message in its full-message format from the one or more messaging service providers, ii) a partner application resident in a second memory of the mobile computing device configured to cooperate with the message notification application on the wearable electronic device, where the partner application is configured to receive the incomplete data set from the message notification application and then provide all or a portion of the incomplete data set as search query terms in order for the server module to retrieve the instance of the message in its full-message format, and iii) both i) and ii) above; and where any portions of the message notification application implemented in software is stored on a non-transitory computer-readable medium in an executable format.

17. The method of claim 16,
where the message notification application is an e-mail notification application configured to work with one or more e-mail service providers,
where the message is an e-mail message,
where the server module is configured to receive the incomplete data set associated with the e-mail message from the partner application for the search query terms, and
where the server module is configured to send the search query terms to the one or more e-mail service providers.

18. The method of claim 17,
where the server module is configured to put the incomplete data set into a format and schema of an application programming interface for a first e-mail service provider, as well as put the incomplete data set into a format and schema of an application programming interface for a second e-mail service provider when communicating with the second e-mail service provider,
where the server module is configured to match the incomplete data set against complete data sets for e-mail messages in their full-message formats on e-mail servers of the one or more e-mail service providers and then rank match strengths for correspondence between the incomplete data set and the complete data sets for the e-mail messages, and
where the server is configured to convert one or more user-selected messaging actions respectively into one or more IMAP commands for use with the e-mail message with the highest match strength.

19. The method of claim 17,
where the server has its own e-mail database with e-mail messages retrieved and downloaded from the one or more e-mail service providers,
where the server module is configured to match the incomplete data set against complete data sets for e-mail messages in their full-message formats in its own e-mail database and then rank match strengths for correspondence between the incomplete data set and the complete data sets of the e-mail messages that are retrieved and downloaded,
where the server is configured to convert one or more user-selected messaging actions respectively into one or more IMAP commands for use with the e-mail message with the highest match strength, and
where the server is configured to provide the one or more IMAP commands to e-mail servers of the one or more e-mail service providers with the corresponding e-mail message with the highest match strength.

20. A system, comprising: an e-mail server of an e-mail service provider; a message notification application, including any of an e-mail notification application, an SMS notification application, or a chat or other instant message notification application, resident in a first memory on a wearable electronic device configured to provide messaging actions including one or more messaging actions selected from the group of a reply action, a reply-to-all action, a forward action, a delete action, an archive action, a flag action, and a mark-as-read action; where the message notification application is configured to allow a user to take one or more of the messaging actions regarding a notification from within the message notification application; where the message notification application has one or more user interfaces to present content of a message of a message application selected from an e-mail application, an SMS application, or a chat or other instant message application resident on a mobile computing device on a display screen of the wearable electronic device; where the message notification application is configured to analyze a notification of the message from the message application in order to obtain an incomplete data set associated with the message where the message notification application is configured to analyze a notification of the message from the message application in order to obtain an incomplete data set associated with the message coming from the message application resident on the mobile computing device, where the incomplete data set at least includes any two or more of i) a name of a sender of the message, some text from a body of the message, content in a subject line of the message, and a timestamp of the message; where the message notification application is configured to provide the user of the wearable electronic device a way to select from the one or more messaging actions using the incomplete data set without leaving the message notification application; where the message notification application is configured to work with any of the group of i) a server configured to integrate with one or more application programming interfaces of one or more messaging service providers, where the server has a server module configured to receive the incomplete data set and use all or a portion of the incomplete data set as search query terms to retrieve an instance of the message in its full-message format from the one or more messaging service providers, ii) a partner application resident in a second memory of the mobile computing device configured to cooperate with the message notification application on the wearable electronic device, where the partner application is configured to receive the incomplete data set from the message notification application and then provide all or a portion of the incomplete data set as search query terms in order for the server module to retrieve the instance of the message in its full-message format, and iii) both i) and ii) above; and where any portions of the message notification application implemented in software is stored on a non-transitory computer-readable medium in an executable format.

\* \* \* \* \*